US007400772B1

(12) United States Patent
Keenan

(10) Patent No.: US 7,400,772 B1
(45) Date of Patent: Jul. 15, 2008

(54) SPATIAL COMPRESSION ALGORITHM FOR THE ANALYSIS OF VERY LARGE MULTIVARIATE IMAGES

(75) Inventor: Michael R. Keenan, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 833 days.

(21) Appl. No.: 10/772,805

(22) Filed: Feb. 4, 2004

Related U.S. Application Data

(60) Provisional application No. 60/472,447, filed on May 20, 2003.

(51) Int. Cl.
G06K 9/36 (2006.01)
G06K 9/46 (2006.01)
H04B 1/66 (2006.01)

(52) U.S. Cl. ...................... 382/232; 375/240

(58) Field of Classification Search ......... 382/232–253; 356/300–305; 375/240, 240.01–240.24
See application file for complete search history.

(56) References Cited

U.S. PATENT DOCUMENTS

| 4,660,151 A | * | 4/1987 | Chipman et al. ............ 356/326 |
| 5,379,352 A | * | 1/1995 | Sirat et al. .................. 382/276 |
| 5,461,422 A | * | 10/1995 | Hsieh .................... 375/240.03 |
| 5,610,836 A | * | 3/1997 | Alsmeyer et al. ............ 702/27 |
| 6,341,257 B1 | * | 1/2002 | Haaland ...................... 702/27 |
| 6,415,233 B1 | * | 7/2002 | Haaland ...................... 702/22 |
| 6,584,413 B1 | * | 6/2003 | Keenan et al. ................ 702/28 |
| 6,675,106 B1 | * | 1/2004 | Keenan et al. ................ 702/28 |
| 6,687,620 B1 | * | 2/2004 | Haaland et al. ............... 702/22 |
| 6,757,648 B2 | * | 6/2004 | Chen et al. .................. 704/203 |
| 6,771,828 B1 | * | 8/2004 | Malvar ...................... 382/240 |
| 6,813,384 B1 | * | 11/2004 | Acharya et al. ............ 382/232 |
| 6,842,702 B2 | * | 1/2005 | Haaland et al. ............... 702/18 |
| 6,922,645 B2 | * | 7/2005 | Haaland et al. ............... 702/76 |
| 7,092,965 B2 | * | 8/2006 | Easwar ...................... 382/232 |
| 7,283,684 B1 | * | 10/2007 | Keenan ..................... 382/276 |
| 2002/0146160 A1 | * | 10/2002 | Parker et al. ................ 382/131 |
| 2004/0064259 A1 | * | 4/2004 | Haaland et al. ............... 702/18 |

OTHER PUBLICATIONS

"Rapid analysis of Raman image data using two-way multivariate curve resolution," J.J. Andrew and T.M. Hancewicz, Applied Spectroscopy, vol. 52, No. 6, 1998.*

"Algorithms for constrained linear unmixing with application to the hyperspectral analysis of fluorophore mixtures," M.R. Keenan, J.A. Timlin, M.H. Van Benthem, and D.M. Haaland, Proc. SPIE 4816, 193-202 (2002).*

(Continued)

Primary Examiner—Bhavesh Mehta
Assistant Examiner—Manav Seth
(74) Attorney, Agent, or Firm—Kevin W. Bieg

(57) ABSTRACT

A method for spatially compressing data sets enables the efficient analysis of very large multivariate images. The spatial compression algorithms use a wavelet transformation to map an image into a compressed image containing a smaller number of pixels that retain the original image's information content. Image analysis can then be performed on a compressed data matrix consisting of a reduced number of significant wavelet coefficients. Furthermore, a block algorithm can be used for performing common operations more efficiently. The spatial compression algorithms can be combined with spectral compression algorithms to provide further computational efficiencies.

26 Claims, 16 Drawing Sheets

OTHER PUBLICATIONS

F. Vogt and M. Tacke, Fast principal component analysis of large data sets, Chemometrics and Intelligent Laboratory Systems, vol. 59, Issues 1-2, Nov. 28, 2001, pp. 1-18.*

Andrew et al., "Rapid Analysis of Raman Image Data Using Two-Way Multivariate Curve Resolution," *Applied Spectroscopy* 52, 797 (1998).

Alsberg et al., "Speed improvement of multivariate algorithms by the method of postponed basis matrix multiplication Part I. Principal component analysis," *Chemometrics Intell. Lab. Syst. 24*, 31 (1994).

Kiers et al., "Relating two proposed methods for speedup of algorithms for fitting two- and three-way principal component and related multilinear models," *Chemometrics Intell. Lab. Syst. 36*, 31 (1997).

Vogt et al., "Fast principal component analysis of large data sets," *Chemometrics Intell. Lab. Syst. 59*, 1 (2001).

Vogt et al., "Fast principal component analysis of large data sets based on information extraction," *J. Chemometrics* 16, 562 (2002).

Gallivan et al., "Impact of Hierarchical Memory Systems on Linear Algebra Algorithm Design," *Int. J. Supercomputer Applications* 2, 12 (1988).

Bro et al., "A Fast Non-Negativity-Constrained Least Squares Algorithm," *J. Chemometrics* 11, 393 (1997).

Wu et al., "The kernal PCA algorithms for wide data. Part I: theory and algorithms," *Chemometrics Intell. Lab Syst. 36*, 165 (1997).

Kotula et al., "Automated Analysis of SEM X-Ray Spectral Images: A Powerful New Microanalysis Tool," *Microscopy and Microanalysis* 9, 1 (2003).

Bro et al., "Improving the speed of multi-way algorithms: Part II: Compression," *Chemometrics Intell. Lab Syst. 42*, 105 (1998).

* cited by examiner

Row-oriented algorithm:

```
nrows = 32768; ncolumns = 1024;
A = rand(nrows, ncolumns);
B = zeros(size(A));
v = rand(1, ncolumns);
tic, for j = 1:nrows
    B(j,:) = A(j,:) .* v;
end, toc
```

Column-oriented algorithm:

```
nrows = 1024; ncolumns = 32768;
A = rand(nrows, ncolumns);
B = zeros(size(A));
v = rand(nrows, 1);
tic, for j = 1:ncolumns
    B(:,j) = A(:,j) .* v;
end, toc
```

FIG. 3

SPATIAL COMPRESSION ALGORITHM FOR THE ANALYSIS OF VERY LARGE MULTIVARIATE IMAGES

CROSS-REFERENCE TO RELATED APPLICATIONS

This application claims the benefit of U.S. Provisional Application No. 60/472,447, filed May 20, 2003, which is incorporated herein by reference. This application is related to U.S. patent application Ser. No. 10/772,548, filed of even date with this application.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to multivariate image analysis and, in particular, to methods for compressing data and using block algorithms to enable the analysis of very large multivariate images.

BACKGROUND OF THE INVENTION

Comprehensive chemical characterization of a complex microstructure is a daunting task. Recently, full spectrum imaging instruments have become available that can collect a complete spectrum at each point in a spatial array and which promise to provide the data needed to perform such a characterization. A remaining hurdle is the computational difficulty of reducing the very large quantities of raw spectral data to meaningful chemical information.

Analysis of full spectrum images having sizes that can be collected with current instrumentation can outstrip the computational resources typically found in the laboratory. For example, a typical commercial energy dispersive x-ray imaging system can produce a 1024×1024 pixel (one megapixel) image with each pixel being represented by a complete 1024 channel x-ray spectrum. Four Gbytes of computer memory are required just to hold a single precision floating point representation of this data set. To put this number in context, 4 Gbytes equals the full physical address space of a modern 32-bit microprocessor. This data overload precludes the use of standard analysis algorithms, which require that all of the data to be in the computer's physical memory at one time.

A related issue is the computational complexity of the analysis algorithms. While the time required to fully read a given data set obviously scales linearly with the size of the data set, the analysis algorithms may scale up more quickly, leading to unacceptable computation times. To take one example, given a m×p matrix with m≧p, Singular Value Decomposition (SVD), a popular method for effecting Principal Components Analysis (PCA), requires computing time proportional to $m \times p^2$.

Researchers have taken a number of different approaches in attempting to overcome the foregoing computational problems. Current approaches to analyzing very large spectrum images range from downsampling to simply omitting data to various data compression schemes. In the context of spectroscopic data, the general idea behind data compression is to represent a high dimensional spectrum in terms of a lower dimension basis. Convenient bases include B-splines and wavelets. A principal component basis derived from PCA can yield good compression, provided the PCA can be computed. While these approaches are effective at reducing the size of the problem to be solved, they suffer the potential drawback that they work with an approximation to the data rather than the data itself. Whether or not the approximation is acceptable depends on the details of the data and the problem at hand. See, e.g., J. Andrew and T. Hancewicz, "Rapid Analysis of Raman Image Data Using Two-Way Multivariate Curve Resolution, *Applied Spectroscopy* 52, 797 (1998); B. Alsberg and O. Kvalheim, "Speed improvement of multivariate algorithms by the method of postponed basis matrix multiplication Part I. Principal component analysis", *Chemometrics Intell. Lab. Syst.* 24, 31 (1994); H. Kiers and R. Harshman, "Relating two proposed methods for speedup of algorithms for fitting two- and three-way principal component and related multilinear models", *Chemometrics Intell. Lab. Syst.* 36, 31 (1997); F. Vogt and M. Tacke, "Fast principal component analysis of large data sets", *Chemometrics Intell. Lab Syst.* 59, 1 (2001); and F. Vogt and M. Tacke, "Fast principal component analysis of large data sets based on information extraction," *J. Chemometrics* 16, 562 (2002).

The current invention overcomes these limitations by combining compression strategies with image analysis algorithms that operate directly on the compressed data. Spectral compression is described herein using an exemplary PCA-factored representation of the data. Furthermore, a block algorithm can be used for performing common operations more efficiently. A key advantage of the block algorithm is that at no point is it required to have all of the data residing simultaneously in the computer's main memory, enabling the operations to be performed on larger-than-memory data sets. For example, the block algorithm can be used that is suitable for out-of-core kernel PCA and a Multivariate Curve Resolution—Alternating Least Squares (MCR-ALS) procedure that directly employs a PCA representation of the data. The crossproduct matrix that is formed during the PCA compression using the block algorithm is mathematically identical to the one that would be computed if the entire data set could have been held in memory. Consequently, data sets that are larger than memory are readily analyzed. The performance of the algorithm is characterized for data sets ranging in size to upward of one billion individual data elements. For sufficiently large data sets, an out-of-core implementation of the algorithm extracts only a minor performance penalty over a fully in-core solution.

Multiresolution spatial processing, or spatial compression, can be used separately or in combination with the spectral compression algorithm and image analysis techniques to provide speed improvements without the loss of spatial or spectral resolution. Spatial compression is described herein using an exemplary Haar wavelet transform. Multiresolution techniques have been used in traditional image processing and, in fact, serve as the basis of the recently introduced JPEG2000 image compression standard. Similar ideas can be applied to spatially compress high-spectral-dimension images. The basic idea is to reduce the number of pixels analyzed to a smaller number of coefficients that capture all of the spatial information of interest. Using orthogonal wavelets to perform this compression allows standard multivariate curve resolution techniques to be applied to the coefficients themselves rather than the raw data. This can lead to a tremendous reduction in both the computational resources and time required to complete the analysis. In addition to improved computational performance, the multiresolution approach can also yield improved sensitivity to minor constituents for data having low signal to noise ratios. This is particularly true if the multiresolution spatial filters are matched to the features of interest in the sample.

SUMMARY OF THE INVENTION

The method of the present invention is directed to spatial compression algorithms for analyzing multivariate images, comprising providing a data matrix containing measured spectral data, transforming the data matrix, using a wavelet transform, to obtain a transformed data matrix, performing an image analysis on the transformed data matrix to obtain a transformed concentration matrix and a spectral shapes matrix, and computing a concentration matrix from the transformed concentration matrix. The wavelet transform preferably comprises a Haar wavelet. The wavelet coefficients of the transformed data matrix can be thresholded, to compress the important spatial information in a reduced number of significant wavelet coefficients that is small compared to the number of original pixels. The image analysis is preferably a MCR-ALS analysis, using a transformed non-negativity constraint. The concentration matrix can be computed from either an inverse transformation of the transformed concentration matrix or by projecting the data matrix onto the spectral shapes matrix to reconstruct the component maps with full spatial resolution. Furthermore, the spatial compression algorithm can use a block algorithm. The data block is suitably sized to fit in core memory and consists of full image planes for some number of spectral channels.

The spatial compression algorithms can be combined with a spectral compression algorithm to provide further computational efficiencies. Spectral compression uses a factored representation of the data. The factored representation preferably comprises a scores matrix and a loadings matrix derived from a principal components analysis of the data matrix. More preferably, the factored representation represents the most significant components of the principal components analysis.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

FIG. 3 shows a MATLAB® code to demonstrate the performance difference between row-oriented and column-oriented algorithms for arrays stored in column-major order.

FIG. 13A shows a scanning electron micrograph of the geological sample. FIG. 13B shows the results of the MCR-ALS analysis of the EDX image compressed to the level four approximation. FIG. 13C shows the level four compressed image of the silicate component. FIG. 13D shows the silicate image reconstructed from the compressed image of the silicate component.

FIG. 15A shows the distributions of the glass and alumina phases obtained at full spatial resolution. FIG. 15B shows the corresponding components obtained after 7 levels of compression along the row dimension and no compression along the column dimension.

DETAILED DESCRIPTION OF THE INVENTION

As problem sizes begin to test the limits of available computing resources, it becomes necessary to pay close attention to the details an algorithm's implementation in order to achieve optimal or even acceptable performance. How an algorithm is structured with respect to the computer system's memory architecture is perhaps the foremost influence in this regard.

In the present invention, by paying careful attention to data locality, efficient block algorithms can be devised for performing common operations on data sets. The block algorithms enable the analysis of larger-than-memory data sets and the improved performance for data sets that are small enough to fit entirely within memory. Contrary to conventional wisdom, for linear algebra operations typical of chemometrics, movement between disk storage and main memory can be minimized such that disk access time can be a small part of the total computation time for the analysis of large data sets. Alternatively, performance can be improved for smaller data sets by minimizing the movement between main memory and cache memory. To demonstrate these ideas, a block algorithm has been designed and implemented that enables the more efficient use of a computer's memory to push back apparent memory limitations.

Figure 1:
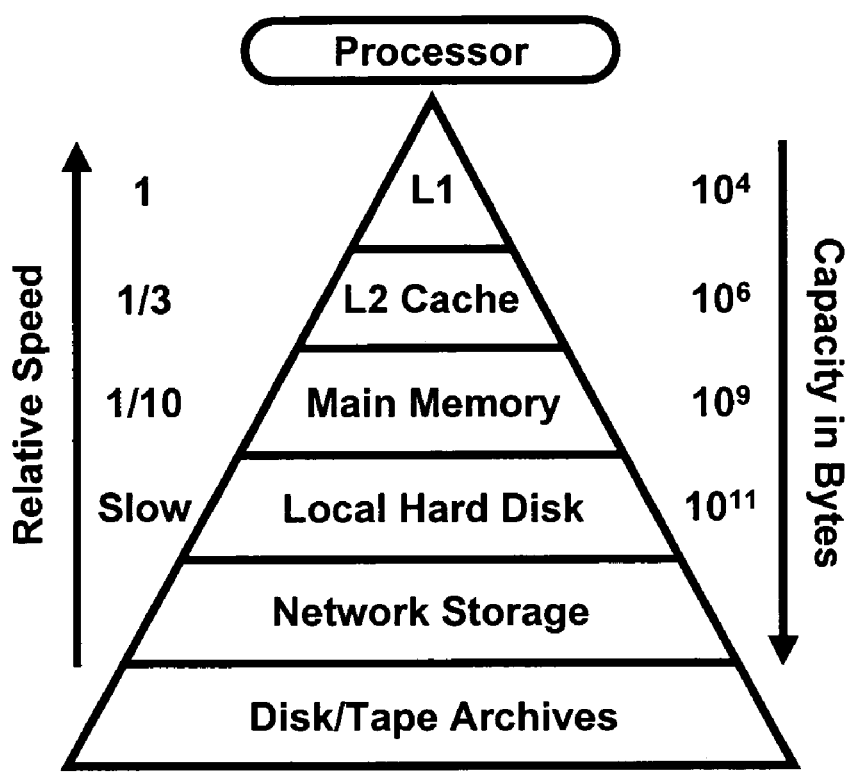
FIG. 1 shows the memory hierarchy for a conventional personal computer.

In FIG. 1 is shown the memory hierarchy of a typical personal computer, where memory is viewed expansively to include any stored data that could be made available to the processor. In general, speed goes up but capacity goes down as we move up the hierarchy toward the processor. As a problem size grows, we are forced to move down the hierarchy to gain access to sufficient memory, at the cost of losing performance. See K. Gallivan et al., "Impact of Hierarchical Memory Systems on Linear Algebra Algorithm Design," *Int. J. Supercomputer Applications* 2, 12 (1988).

To make efficient use of the memory hierarchy, it is necessary to design an algorithm with data locality in mind. Two flavors of locality are generally considered. Temporal locality relates to the tendency for a given memory location to be accessed repeatedly over a short period of time. Utilizing spatial locality, on the other hand, means designing an algorithm to access nearby memory locations together. In terms of the memory hierarchy, exploiting locality and designing for performance means minimizing data flow between different levels of the hierarchy while trying to perform as many operations as possible in the higher levels. These ideas have been critical in obtaining high performance in distributed computing environments where inter-processor communication poses a bottleneck, but they have been paid relatively scant attention by users of stand-alone computers.

Figure 2:
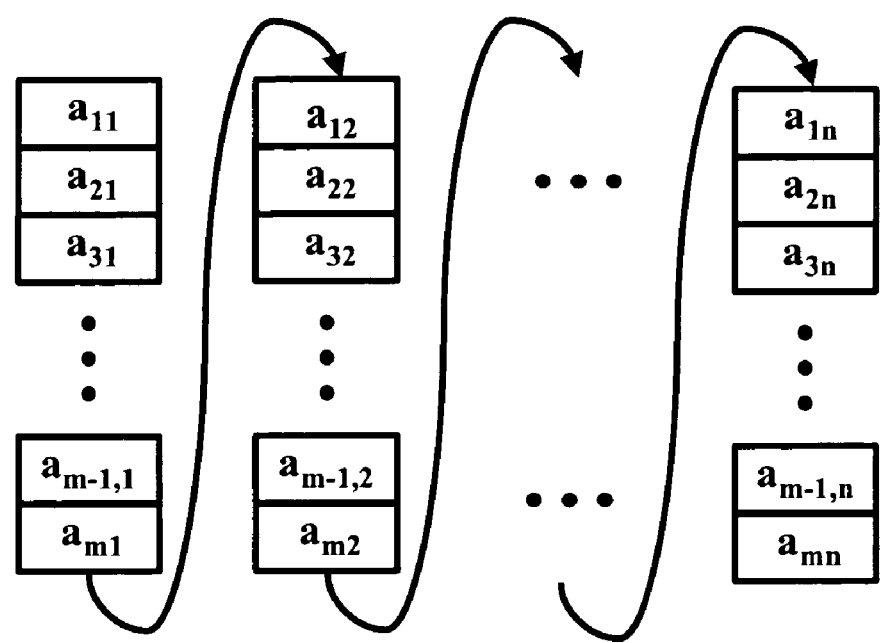
FIG. 2 shows a memory arrangement for an m×n matrix A stored in column-major order.

That locality is important in the latter environment, however, can be easily demonstrated by a simple example. Consider programming in the popular MATLAB® environment. See MATLAB Version 6.5, The Mathworks, Natick, Mass. MATLAB® stores matrices in column-major order, as depicted by matrix A in FIG. 2. Thus, matrix elements that are adjacent in a column are, in fact, adjacent in memory, whereas, elements that are adjacent in a row are separated in memory by the number of rows in the matrix. To make the most of spatial locality, in this case, algorithms should be designed to operate on columns of the matrix rather than on rows.

FIG. 3 shows two MATLAB® code fragments. These scale the rows and columns of a matrix, respectively, by the elements of a vector. Using a Windows 2000-based computer with a 1 GHz Pentium III processor, 1 Gbyte of main memory and a 256-Kbyte L2 cache, the row-oriented algorithm completed in 12.5 sec., whereas the column-oriented algorithm took only 1.8 sec. Note that exactly the same mathematical operations are being performed in both cases. The improvement in performance by almost a factor of 7 can be attributed to good utilization of spatial locality in the column-oriented algorithm. Since the adjacent elements in a row of A are separated by a distance that is greater than the cache size, the row-oriented algorithm makes very poor use of cache memory and requires many more accesses to the slower main memory, resulting in degraded performance.

The preceding example and discussion were concerned with performance in the case that a problem is too large to be contained fully in cache memory, but which did fit within the computer's main memory. As problems become too large to be contained in main memory, the next level in the memory hierarchy, the local disk storage, comes into play. Data analysts have some experience with using disk storage to mimic main memory in the virtual memory capability of modern operating systems. This experience has invariably been negative from the standpoint of numerically intensive computation. Once the operating system begins "swapping to disk," the speed of numerical algorithms is brought to a crawl. However, it should be kept in mind that the disk usage, in this case, is being controlled by the operating system—not by the algorithm. By explicitly considering disk usage when designing large-scale algorithms, rational choices about disk usage can be made up front and disk-based memory can provide an effective solution to the larger-than-memory problem. The design considerations when using disk storage are the same as the ones discussed previously—minimize the flow of data between levels of the memory hierarchy and perform as many calculations as possible at the highest level possible.

A key to making efficient use of disk storage is the development of block algorithms for common linear algebra operations. See G. H. Golub and C. F. Van Loan, *Matrix Computations*, $3^{rd}$ Ed., The John Hopkins University Press, Baltimore, Md. (1996). Block techniques have played an important role in designing high performance algorithms both on hierarchical uniprocessor systems and in parallel computing environments.

The block algorithm can be combined with data compression algorithms to enable the efficient analysis of very large multivariate images. This approach will be illustrated in the following description by the development of a block algorithm for performing PCA that is suitable for use in applications in which the entire data set cannot be contained simultaneously within main memory. When performing PCA with the block algorithm, the algorithm is capable of producing a mathematically exact factorization of a data matrix into scores and loadings. Substantial speed improvements can then be achieved by truncating the factorization to the number of chemically relevant factors either known a priori or estimated from the data. The algorithm can also accommodate several common preprocessing operations such as mean-centering, autoscaling, and weighting by a diagonal or block-diagonal matrix. The block algorithm for PCA can also be used with the multiresolution spatial processing either pre- or post-factorization.

Multivariate Spectral Analysis

Multivariate spectral analysis can be applied to spectral data produced by a variety of spectroscopic imaging techniques, including: Electron Probe Microanalysis (EPMA), Scanning Electron Microscopy (SEM) with attached Energy Dispersive X-Ray Spectrometer (EDX), X-Ray Fluorescence (XRF), Electron Energy Loss spectroscopy (EELS), Particle Induced X-ray Emission (PIXE), Auger Electron Spectroscopy (AES), gamma-ray spectroscopy, Secondary Ion Mass Spectroscopy (SIMS), X-Ray Photoelectron Spectroscopy (XPS), Infrared Spectroscopy (IR), Raman Spectroscopy, Magnetic Resonance Imaging (MRI) scans, Computerized Axial Tomography (CAT) scans, IR reflectometry, Mass Spectrometry (MS), multidimensional chromatographic/ spectroscopic techniques, hyperspectral remote imaging sensors, etc.

In general, an image can comprise any arbitrary, multidimensional array of points. The image can include a spatial dimension, such as lines, traditional 2D images, or 3D volumes; or a temporal dimension, such as a time series of images. In the case of a gas chromatography/mass spectroscopy (GC/MS) image, the dimension is a separation coordinate. The multivariate image analysis techniques will be described herein in reference to a spatial dimension. However, it is understood that the techniques can be applied also to non-spatial images, such as those comprising a time series or chromatographic coordinate.

In general, multivariate spectral analysis for chemical characterization of a sample can include: determining the number of chemical species (pure elements and chemical phases or alloys) that comprise an inhomogeneous mixture being imaged; extracting the spectra of these "pure" components (elements or phases); quantifying the amount or concentration of each component present in the sample; and mapping the spatial distribution of these components across the sample.

Multivariate spectral analysis can be performed on a full spectrum image that can be represented as a two-dimensional data matrix D. A two-dimensional data matrix D can be obtained by unfolding a measured multidimensional spectral data set D̲. For example, the multidimensional spectra data set D̲ can be a data cube that comprises a 1D spectrum at each pixel on a 2D spatial grid corresponding to the (X,Y) coordinates of the pixel's location. The 2D data matrix D enables the easy and efficient use of standard linear algebra and matrix operations.

The data matrix D can be factored into the product of two matrices, C and $S^T$, according to:

$$D = CS^T \quad (1)$$

where D has dimensions of m×p, and m is the number of pixels and p is the number of spectral channels. The matrix C is a concentration matrix, which is related to the concentration of the chemical phases (e.g., a matrix representing a map of the component abundances) and has dimensions of m×q, where q is the number of pure components. The matrix S is a spectral shapes matrix, which contains information about the spectral shapes of the pure chemical components (e.g., a matrix of the pure component spectra). S has dimensions p×q.

The factorization of Eq. (1) can be accomplished by an image analysis of D. A number of prior image analysis methods are described in U.S. Pat. No. 6,675,106 to Keenan and Kotula and U.S. Pat. No. 6,584,413 to Keenan and Kotula, which are incorporated herein by reference. A preferred image analysis method comprises a constrained MCR-ALS analysis of Eq. (1). A variety of constraint conditions can be used. For example, the constraint condition can be a non-negativity constraint. Alternatively, the constraint condition can be chosen to track a physical attribute. The concentrations C can be constrained to be either monotonically increasing or decreasing over time, for example, when monitoring a chemical reaction over time. Alternatively, the concentrations C or spectral shapes S can be constrained to be unimodal. Alternatively, the spectral shapes S can be constrained to a fixed number of spectral peaks (e.g., a single peak for chromatography, or, to less than three peaks). Alternatively, the spectral shapes S can be constrained to match the shape of a Gaussian distribution. The factors can also be partially constrained. For example, the concentration of a particular species can be zero at a particular location and unconstrained elsewhere.

In an exemplary MCR-ALS analysis, non-negativity constraints can be applied to the chemical concentrations and spectral intensities. One overall procedure for applying non-negativity constraints is described by R. Bro and S. De Jong, "A Fast Non-Negativity-Constrained Least Squares Algorithm", *Journal of Chemometrics* 11, 393 (1997), which is incorporated herein by reference.

In a non-negativity constrained MCR-ALS analysis, an initial feasible estimate can be made for S (Bro starts with all zeros as an initial feasible solution). Eq. (1) can then be solved for C under the non-negativity constraint:

$$\min_C \|D - CS^T\|_F, \text{ subject to } C \geq 0. \quad (2)$$

where F represents the Frobenius norm, which is computed as the square root of the sum of the squared elements of a matrix. Given the first estimate of C obtained by solving Eq. (2), Eq. (1) can be solved for S under the non-negativity constraint:

$$\min_S \|D - CS^T\|_F, \text{ subject to } S \geq 0. \quad (3)$$

Next, a convergence metric can be computed and compared to a convergence criterion. If the convergence metric is less than the convergence criterion, then convergence has been achieved and the procedure is completed. If not, then the steps are repeated (i.e., iterated) as many times as is needed until an acceptable (i.e., sufficient) level of convergence is achieved or until a fixed number of iterations have been completed. In general, the goal of the MCR-ALS analysis is to achieve a least squares solution to Eq. (1) by testing for convergence, according to:

$$\min_{C,S} \|D - CS^T\|_F, \text{ subject to } C \geq 0 \text{ and } S \geq 0. \quad (4)$$

The previous discussion assumed that the MCR-ALS analysis started by making an initial estimate for S and then solving Eq. (2) for C, and so on. However, the roles of C and S can be easily interchanged by making an initial feasible estimate for C and first solving Eq. (3) for S.

If desired, the measured data matrix D can be weighted, depending on the type of experiment being analyzed, and depending on the properties of the noise or background signal generated during data acquisition. Weighting is generally used whenever the properties of the noise are not uniform throughout the measurement space (i.e., heteroscedastic noise). This is particularly true in the case of "counting" experiments in which the noise is characterized as following a Poisson probability distribution in which the magnitude of the uncertainty varies with the magnitude of the signal. For multi-channel data acquisition the noise is not characterized by a single probability distribution, but rather, by a distribution whose parameters will, in principle, differ from channel to channel and from pixel to pixel within a channel. Additionally, heteroscedasticity can also arise from other effects, e.g., non-uniform detector responses, or mathematical transformations applied to the data (e.g., taking logarithms).

Weighting is also useful when there is a large disparity between the total number of counts (e.g., observations) arising from different elements or phases (e.g., a sample comprising a small amount of contaminant located on top of a substrate made of a single material). Weighting, therefore, is useful for accurately identifying minor phases, trace elements, or subtle gradients in composition across a sample. By properly accounting for experimental noise characteristics, chemically relevant features having small number of counts can become more significant, in a least squares sense, than large magnitude noise associated with major spectroscopic features.

Weighting can also be used to account for data "outliers". Data outliers can include malfunctioning energy channels or pixel elements in a detector array. For example, a dead (i.e., inoperative) energy channel (e.g., zero signal) can be effectively removed from the data matrix D by assigning a sufficiently small weight. Alternatively, for detectors that use a CCD pixel array, an occurrence of a "hot" (i.e., saturated) or dead pixel can be weighted in a similar fashion, namely, by assigning a sufficiently small weight.

Data matrix D can be weighted to create a weighted data matrix D̲ according to:

$$D = GDH \quad (5)$$

where G is a pre-multiply weighting matrix having dimensions m×m; and H is a post-multiply weighting matrix having dimensions p×p. In general, G is used to weight the row-space of D, and H is used to weight the column-space of D. Obviously, the weighting matrices G and H can be the identity matrix if no weighting is desired.

The matrix G can be used to account for unequal variance in the observations from pixel-to-pixel, independent of channel number (i.e., energy or wavelength). For example, weighting by G could be used in the case where there are hot or dead pixels, or if there was an array detector where different detector elements had different noise properties. Weighting by G also could be used in the situation where there were much higher total counts in some pixels as compared to others, caused, for example, by unequal dwell times.

The matrix H can account for unequal variance in the observations from channel-to-channel, independent of pixel location. For example, weighting by H could be used when the noise level varies from one energy channel to the next. For X-ray detection in spectral analysis, the noise will be higher on average in channels that have greater signal on average due to the Poisson nature of a counting experiment.

If the data matrix D is weighted, the test for convergence of the constrained ALS solution is:

$$\min \| GDH - GCS^T H \|_F = \min \| \tilde{D} - \tilde{C}\tilde{S}^T \|_F \quad (6)$$

where $\tilde{D}$ is the weighted data matrix, $\tilde{C} = GC$ is the weighted concentration matrix, and $\tilde{S}^T = S^T H$ is the weighted spectral shapes matrix. Eq. (6) can be solved with appropriate constraints applied to $\tilde{C}$ and $\tilde{S}^T$, as described above. After estimating the weighted concentrations and spectra, the corresponding unweighted concentrations and spectra can be recovered as $C = G^{-1}\tilde{C}$ and $S^T = \tilde{S}^T H^{-1}$. For simplicity, the analysis of the unweighted data matrix D will be described hereinafter, although it will be understood that the method of the present invention can also be applied to the weighted data matrix $\tilde{D}$.

Spectral Compression Using a Block PCA Algorithm

Below are described spectral compression algorithms, which are the subject of the related U.S. patent application Ser. No. 10/772,548, "Spectral Compression Algorithms for the Analysis of Very Large Multivariate Images". The spatial compression algorithms of the present invention can be combined with these spectral compression algorithms to provide additional computational efficiencies in the analysis of large, high resolution full-spectrum images.

The prior MCR-ALS image analysis method described above, using the full data matrix D, the concentration matrix C, and the spectral shapes matrix S, requires a large amount of memory and computation time. For example, the computation time of $C^T D$ in Eq. (3) is proportional to m×p×q.

The computational complexity can be reduced through a spectral compression of the data matrix using PCA. PCA is one of the core techniques of multivariate statistical analysis and it has been employed in numerous and diverse applications including dimensional reduction, data compression, exploratory data analysis, factor analysis, pattern recognition, classification, and multivariate calibration. In particular, PCA can be used in the analysis of hyperspectral image data. See P. Geladi and H. Grahn, *Multivariate Image Analysis*, Wiley, Chinchester, UK (1996), which is incorporated herein by reference.

The goal of PCA is to extract the useful information in a high-dimension data set into a lower dimension subspace. From a geometric point of view, PCA begins by finding that single direction in the p-dimensional space that best describes the location of the data. The vector describing that direction is the first principal component. Once found, a second direction, orthogonal to the first, is determined that best accounts for the variation in the data that is orthogonal to the first. This is the second principal component. The process continues with each new principal component maximally accounting for the variation in the data that is orthogonal to all preceding components. The first few principal components will contain the chemical information of interest. If there are r such components, the remaining p−r components are assumed to describe experimental noise or error. Limiting further analysis to the r-dimensional subspace defined by the first r principal components provides the desired dimensional reduction and data compression.

In matrix terms, PCA is concerned with factoring a data matrix D into the product of two other matrices, a scores matrix T whose columns are mutually orthogonal and a matrix P of orthonormal loading vectors, according to:

$$D = TP^T \quad (7)$$

To take a spectroscopic example, the loading vectors P describe the spectral characteristics of the chemical constituents of a sample and the scores T are related to their concentrations.

PCA is closely related to the SVD, which is often used to compute the PCA. SVD performs the factorization:

$$D = U\Sigma V^T \quad (8)$$

If D is an m×p matrix, then U and V are m×m and p×p orthogonal matrices, respectively, and $\Sigma$ is an m×p diagonal matrix containing the singular values along the diagonal, ordered by decreasing size. The right singular vectors V provide abstract representations of the spectra of the individual chemical components (e.g., elements or phases). The min(m, p) singular values are related to the amount of variance in the data that is accounted for by the corresponding principal components. Specifically, the $i^{th}$ singular value is equal to the square root of the variance accounted for by the $i^{th}$ principal component. The diagonal form indicates that the transformed data are uncorrelated. By decomposing the data into a set of uncorrelated factors of decreasing statistical significance, data compression can be accomplished by selecting those factors having the greatest statistical significance and discarding the rest as noise or error.

SVD has the useful property that the space spanned by the first r columns of V represents, in a least squares sense, the best rank r approximation to the space spanned by the rows of D. The remaining p−r columns of V represent experimental noise or error and can be discarded. Thus, the scores and loading matrices can be truncated, or compressed, to contain only those vectors corresponding to significant singular values. Letting $V_r$ be the matrix whose columns are the first r columns of V, a r-component PCA model can then be computed, according to:

$$\tilde{P} = V_r \quad (9)$$

$$\tilde{T} = (U\Sigma)_r = D\tilde{P} \quad (10)$$

where Eq. (10) follows from the orthonormality of the columns of $V_r$. Therefore, $\tilde{T}$ is the spectrally compressed scores matrix and $\tilde{P}$ is the spectrally compressed loadings matrix.

In the case of large spectral images, SVD becomes a very inefficient way to compute the principal components. As described below, in the typical case that the number of pixels, m, is greater than the number of spectral channels, p, a better approach is to consider the p×p crossproduct, or kernel matrix $D^T D$. Those skilled in the art will appreciate that the methods can also be applied to cases where p>m, in which case the crossproduct matrix would be computed as $DD^T$. See W. Wu, D. Massart, and S. de Jong, "The kernel PCA algorithms for wide data. Part I: theory and algorithms", *Chemometrics Intell. Lab Syst.* 36, 165 (1997), which is incorporated herein by reference.

Starting with Eq. (8), the crossproduct matrix can be written $$D^T D = V \Sigma^T U^T U \Sigma V^T = V(\Sigma^T \Sigma) V^T = VEV^T \quad (11)$$

Eq. (11) has the form of a standard symmetric matrix eigenvalue problem, which is readily solved by standard methods. E, in this equation, is a p×p diagonal matrix of eigenvalues sorted in descending order. Given V, the PCA model can, once again, be computed according to Eqs. (9) and (10), where only the first r columns of V are used to compute the compressed loading matrix $\tilde{P}$ and the compressed scores matrix $\tilde{T}$.

Alternatively, the data may be presented as an arbitrary f-component factor model according to:

$$D = AB^T \quad (12)$$

where A and B are m×f and p×f data factor matrices, respectively. Therefore, the data factor matrix A comprises the spatial information and the data factor matrix B comprises the spectral information. The f most significant eigenvalues $E_f$ of $D^T D$ can be obtained from the solution to the generalized symmetric eigenvalue problem $$(A^T A)(B^T B) Y = E_f Y \quad (13)$$

and the corresponding f most significant eigenvectors of $D^T D$ can be computed, according to:

$$V_f = BY \quad (14)$$

A r-component PCA model for D, given r≤f, can then be computed, according to:

$$\tilde{P} = BY_r \quad (15)$$

$$\tilde{T} = A(B^T B) Y_r \quad (16)$$

where the $Y_r$ is the matrix whose columns are the first r columns of Y.

While the eigenvectors V include all of the information contained in the pure spectral components, they do not do so in a chemically recognizable form. Therefore, a single principal component will not, in general, represent either a pure element or a multi-element phase, but rather, a linear combination of such elements or phases. In other words, there may not be a one-to-one correspondence between a selected principal component and a particular chemical phase or pure element. For example, physically admissible concentrations must be non-negative, and the pure spectral components must be greater than the background signal, whereas a general principal components analysis need not be thus constrained. The principal components produced by PCA often have negative values, which presents a spectrum that is difficult for the practicing analyst to understand. Additionally, a major disadvantage of PCA is that the principal components are constrained to be orthogonal, while any chemical phase that contains overlapping spectral peaks will necessarily be non-orthogonal. Therefore, subsequent post-processing of results obtained from PCA is useful for transforming the abstract components into physically meaningful factors.

The principal components can be transformed into more physically realizable spectra by performing an MCR-ALS analysis using the PCA-factored representation of the data. The PCA-factored representation, $TP^T$, can be used in place of the data matrix, D, in Eq. (1), according to:

$$TP^T = CS^T \quad (17)$$

Factorization can then be accomplished by performing a constrained MCR-ALS analysis of Eq. (17). As described above, an initial feasible estimate can be made for S. C can then be computed, subject to constraints, according to:

$$\min_C \| TP^T - CS^T \|_F \quad (18)$$

S can then be computed, subject to constraints, according to:

$$\min_S \| TP^T - CS^T \|_F \quad (19)$$

Eqs. (18) and (19) can be iterated until a sufficient level of convergence is achieved. The roles of C and S can be easily interchanged by making an initial feasible estimate for C and first solving Eq. (19) for S. In general, a least squares solution is achieved by testing for convergence, subject to constraints, according to:

$$\min_{C,S} \| TP^T - CS^T \|_F. \quad (20)$$

This substitution provides chemically recognizable solutions for the concentration matrix C and the spectral shapes matrix S.

Preferably, the MCR-ALS analysis can be performed using the spectrally compressed, PCA-factored representation of the data, subject to constraints, according to:

$$\min_{C,S} \| \tilde{T} \tilde{P}^T - CS^T \|_F \quad (21)$$

Such an MCR-ALS computation using the r-component PCA factor model in place of the full spectral data matrix saves substantial memory and computation time. The number of elements required to describe the compressed data is (m+p)×r, rather than m×p elements in the raw data set, resulting in a considerable savings in computation time in the typical case that m, p>>r.

While this approach is numerically more efficient than direct computation via SVD, the equations, as written, may not make the most effective use of cache memory and may still require the entire data set D to reside in memory in order to form the requisite matrix products. The key to developing an efficient algorithm for PCA that is suitable for larger-than-memory data sets is the realization that both the formation of the crossproduct matrix in Eq. (11) and the projection of the data onto the loading vectors in Eq. (10) can be accomplished in a blockwise manner.

Considering the case, once again, that m>p, D and T (or $\tilde{T}$) can be written as conformable block matrices:

$$D = \begin{bmatrix} D_1 \\ D_2 \\ \vdots \\ D_{j-1} \\ D_j \end{bmatrix} \text{ and } T = \begin{bmatrix} T_1 \\ T_2 \\ \vdots \\ T_{j-1} \\ T_j \end{bmatrix} \quad (22)$$

For illustration, we will assume that each of the j blocks has the same number of rows, m/j, but this is not a requirement in practice. The crossproduct matrix now becomes:

$$D^T D = [D_1^T D_2^T \ldots D_{j-1}^T D_j^T] \begin{bmatrix} D_1 \\ D_2 \\ \vdots \\ D_{j-1} \\ D_j \end{bmatrix} = \sum_{i=1}^{j} D_i^T D_i \quad (23)$$

Eq. (23) shows that the crossproduct matrix $D^TD$ can be accumulated through a series of matrix-matrix multiplications involving the blocks of D. Both the block crossproduct matrix $D_i^T D_i$ and the crossproduct matrix $D^TD$ are of size p×p. However, rather than hold the entire data matrix D, of size m×p, in memory, it is only necessary to hold a block data matrix $D_i$, of size m/j×p, in memory in order to compute the crossproduct matrix $D^TD$. This can be a significant memory-saving advantage for images having many pixels. The requirement is simply that the $D_i$ are suitably sized to fit within main memory of the computer. As will be obvious to those skilled in the art, j can be equal to one and the methods can be applied equally well to unblocked data.

After computing V and P in the standard way, a scores block can be constructed by projecting the data block $D_i$ onto P, according to:

$$T_i = D_i P \quad (24)$$

Preferably, a compressed scores block $\tilde{T}_i$ can be constructed using the block version of Eq. (10). It is at this point that the larger-than-main-memory algorithm pays a penalty, since the data blocks $D_i$ have to be read from disk a second time. The magnitude of the penalty depends on the details of the disk subsystem, total system memory, operating system file caching strategy, etc. However, experience has shown that the penalty is small in comparison to the overall computation time for large spectral image data sets.

Those skilled in the art will appreciate that the factorization can be applied to the case that there are more spectral channels than pixels (i.e., p>m). In this later case, the data block $D_i$ would consist of the full spatial data at some number of spectral channels. The crossproduct matrix would be computed as $DD^T$, and the roles of T and P would be reversed. That is, the eigenvectors would be associated with a single T matrix and $P^T$ would be computed blockwise, according to:

$$P_i^T = T^T D_i \quad (25)$$

The T matrix would have orthonormal columns and the columns of P would be orthogonal. The commonly assumed case of orthogonal columns for T and orthonormal columns for P could be achieved by applying a simple normalization to P and the inverse normalization to T.

Data presented in a factored form according to Eq. (12) is also compatible with a block algorithm. A and $\tilde{T}$ can be written as conformable block matrices:

$$A = \begin{bmatrix} A_1 \\ A_2 \\ \vdots \\ A_{j-1} \\ A_j \end{bmatrix} \text{ and } \tilde{T} = \begin{bmatrix} \tilde{T}_1 \\ \tilde{T}_2 \\ \vdots \\ \tilde{T}_{j-1} \\ \tilde{T}_j \end{bmatrix}. \quad (26)$$

For illustration, we will assume that each of the j blocks has the same number of rows, m/j, but this is not a requirement in practice. The crossproduct data factor matrix $A^TA$ now becomes:

$$A^T A = [A_1^T A_2^T \ldots A_{j-1}^T A_j^T] \begin{bmatrix} A_1 \\ A_2 \\ \vdots \\ A_{j-1} \\ A_j \end{bmatrix} = \sum_{i=1}^{j} A_i^T A_i \quad (27)$$

Eq. (27) shows that the crossproduct data factor matrix $A^TA$ can be accumulated through a series of matrix-matrix multiplications involving the blocks of A. Both the block crossproduct matrix $A_i^T A_i$ and the crossproduct matrix $A^TA$ are of size f×f.

Likewise, B and $\tilde{P}$ can be written as conformable block matrices:

$$B = \begin{bmatrix} B_1 \\ B_2 \\ \vdots \\ B_{k-1} \\ B_k \end{bmatrix} \text{ and } \tilde{P} = \begin{bmatrix} \tilde{P}_1 \\ \tilde{P}_2 \\ \vdots \\ \tilde{P}_{k-1} \\ \tilde{P}_k \end{bmatrix} \quad (28)$$

For illustration, we will assume that each of the k blocks has the same number of rows, p/k, but this is not a requirement in practice. The crossproduct data factor matrix $B^TB$ now becomes:

$$B^T B = [B_1^T B_2^T \ldots B_{k-1}^T B_k^T] \begin{bmatrix} B_1 \\ B_2 \\ \vdots \\ B_{k-1} \\ B_k \end{bmatrix} = \sum_{i=1}^{k} B_i^T B_i \quad (29)$$

Eq. (29) shows that the crossproduct data factor matrix $B^TB$ can be accumulated through a series of matrix-matrix multiplications involving the blocks of data factor matrix B. Both the block crossproduct matrix $B_i^T B_i$ and the crossproduct matrix $B^TB$ are of size f×f.

After computing Y in the standard way as the solution to the generalized symmetric eigenvalue problem in Eq. (13), a block of loading vectors can be constructed according to:

$$\check{P}_i = B_i Y_r \quad (30)$$

and a scores block can be constructed according to:

$$\tilde{T}_i = A_i (B^T B) Y_r \quad (31)$$

Furthermore, the factored representation set can be spatially compressed, as described below. If a spatially compressed data factor matrix $\tilde{A}$ is used, a spatially compressed scores block $\tilde{T}_i$ will be provided by Eq. (31).

In many applications, it is necessary to preprocess the raw data in some manner prior to performing PCA. If it is desired to work with the data's covariance matrix or correlation matrix rather than its crossproduct matrix, for instance, the raw data must be mean-centered and/or variance-scaled. It may also be necessary to weight the data to account for non-uniform noise characteristics. Spectroscopic techniques that rely on photon counting, for example, need to scale the data to reflect the fact that the estimated variance for a given data element is equal to the data element itself. In all of these cases, it is possible either to perform the operation blockwise as the data is read, or to construct a transformation of the crossproduct matrix that achieves the same result.

Several possible transformations of the crossproduct matrix are discussed in the book by Geladi and Grahn. For example, given a crossproduct matrix $Z = D^T D$, the covariance and correlation matrices, $Z_{cov}$ and $Z_{cor}$, can be computed, respectively, by $$Z_{cov} = \left(\frac{1}{m-1}\right)(Z - m\bar{d}\bar{d}^T) \quad (32)$$

and $$Z_{cor} = S^{-1} Z_{cov} S^{-1} \quad (33)$$

In these equations, $\bar{d}$ is a vector whose elements are the column-wise means of D. Given s as the corresponding vector of column-wise standard deviations, the diagonal matrix S is constructed by placing the elements of s along its diagonal.

Clearly, $Z_{cov}$ and $Z_{cor}$ can be computed after the crossproduct matrix has been assembled if $\bar{d}$ and s are available. This is readily accomplished in the block algorithm by accumulating the appropriate sums as the raw data is read. If a row of D, $d_i^T$, represents a single multivariate observation (e.g., the spectrum at a single pixel), then $\bar{d}$ and s are computed according to $$\bar{d} = \left(\frac{1}{m}\right) \sum_{i=1}^{m} d_i \quad (34)$$

and $$s = \sqrt{\frac{\sum_{i=1}^{m} d_i^2 - m\bar{d}^2}{m-1}} \quad (35)$$

with all vector operations being performed element-wise. The sum of the data elements in Eq. (34) and the sum of the squared data elements in Eq. (35) can be accumulated as the individual spectra are read. The mean and standard deviation can then be computed subsequent to reading all of the spectral data. The covariance matrix $Z_{cov}$ or correlation matrix $Z_{cor}$ can then be used to compute eigenvectors and eigenvalues in an eigenanalysis, as described above.

When the data is weighted, equivalent weighting can be applied to the crossproduct, if the weighting matrices are block diagonal in a way that is conformable with the way D is blocked. Typically, weighting matrices are chosen to be diagonal so this restriction poses little practical difficulty. In the general case that both the row-space and the column-space of D are to be weighted, the weighted data matrix $\check{D}$ is given by Eq. (5). For $m \geq p$, the crossproduct of the weighted data is computed as $$\check{D}^T \check{D} = (GDH)^T (GDH) = H^T (D^T G^T G D) H \quad (36)$$

Assuming G is blocked conformably with D:

$$D = \begin{bmatrix} D_1 \\ D_2 \\ \vdots \\ D_{j-1} \\ D_j \end{bmatrix} \text{ and } G = \begin{bmatrix} G_1 & & & \\ & G_2 & & 0 \\ & & \ddots & \\ & 0 & & G_{j-1} \\ & & & & G_j \end{bmatrix} \quad (37)$$

row weighting in Eq. (5) can be performed on-the-fly as $$D^T G^T G D = \sum_{i=1}^{j} D_i^T G_i^T G_i D_i \quad (38)$$

The $G_i$ can either be known a priori or can be computed from the corresponding data blocks $D_i$. In this particular case, column weighting is applied through a direct transformation of the row-weighted crossproduct and no restrictions need to be placed how the matrix H is blocked.

In the case that the data is presented in the factored form according to Eq. (12), the data factor matrices A and B can be preprocessed prior to generalized eigenanalysis to achieve results equivalent to those obtained through eigenanalysis of preprocessed raw data. For example, scores and loading vectors corresponding to an analysis of the data covariance matrix can be obtained from the solution to the generalized symmetric eigenvalue problem:

$$\frac{1}{(m-1)}(A^T A - m\bar{a}\bar{a}^T)(B^T B) = EY \quad (39)$$

according to:

$$\tilde{P} = BY_r \quad (40)$$

and $$\tilde{T} = \sqrt{\frac{1}{(m-1)}} (A - 1_m \bar{a}^T)(B^T B) Y_r$$

In these equations, $\bar{a}$ is a vector whose elements are the column-wise means of a and $1_m$ is an m-vector of ones.

Clearly, Eqs. (39) and (40) are compatible with the block algorithm since $\bar{a}$ can be accumulated as the blocks of A are read. If $a_i^T$ is a row of A, then $$\bar{a} = \left(\frac{1}{m}\right)\sum_{i=1}^{m} a_i \qquad (41)$$

Likewise, scores and loading vectors corresponding to an analysis of the data correlation matrix can be obtained from the solution to:

$$\frac{1}{(m-1)}(A^T A - m\bar{a}\bar{a}^T)(B^T S^{-2} B) = EY \qquad (42)$$

according to:

$$\check{P} = S^{-1} B Y_r \qquad (43)$$

and $$\check{T} = \sqrt{\frac{1}{(m-1)}} (A - 1_m \bar{a}^T)(B^T B^{-2} B) Y_r$$

Eqs. (42) and (43) can be implemented with block algorithms by blocking the diagonal matrix S conformably with B $$B = \begin{bmatrix} B_1 \\ B_2 \\ \vdots \\ B_{k-1} \\ B_k \end{bmatrix} \text{ and } S = \begin{bmatrix} S_1 & & & \\ & S_2 & & 0 \\ & & \ddots & \\ & 0 & & S_{k-1} \\ & & & & S_k \end{bmatrix} \qquad (44)$$

Then, $$B^T S^{-2} B = \sum_{i=1}^{k} B_i^T S_i^{-2} B_i \qquad (45)$$

Assuming the blocks of A are read first, $A^T A$ and $\bar{a}$ have been computed, and $b_i^T$ is a row of B, the elements of the diagonal matrix S can be computed as the blocks of B are read, according to:

$$S_{ii} = \sqrt{\frac{b_i^T A^T A b_i - m(b_i^T \bar{a})^2}{m-1}} \qquad (46)$$

Thus, the block $S_i$ depends only on the block $B_i$ and the requisite block matrix multiplications can be performed independently and accumulated according to Eq. (45).

If the data is to be weighted, weighted scores and loading vectors can be obtained from the solution to generalized symmetric eigenvalue problem:

$$(A^T G^T G A)(B^T H^T H B) Y = E Y \qquad (47)$$

according to:

$$\check{P} = H B Y_r \qquad (48)$$

and $$\check{T} = (GA)(B^T H^T H B) Y_r.$$

Once again, the block algorithm can be applied in the typical case that the weighting matrices G and H are block diagonal in a manner that is conformable with A and B, respectively, according to:

$$A^T G^T G A = \sum_{i=1}^{j} A_i^T G_i^T G_i A_i \qquad (49)$$

and $$B^T H^T H B = \sum_{i=1}^{k} B_i^T H_i^T H B_i$$

The $G_i$ and $H_i$ can be known a priori, can be read from header information stored with the factored data, or can be derived from statistical summaries of the data computed from A and B.

Figure 4:
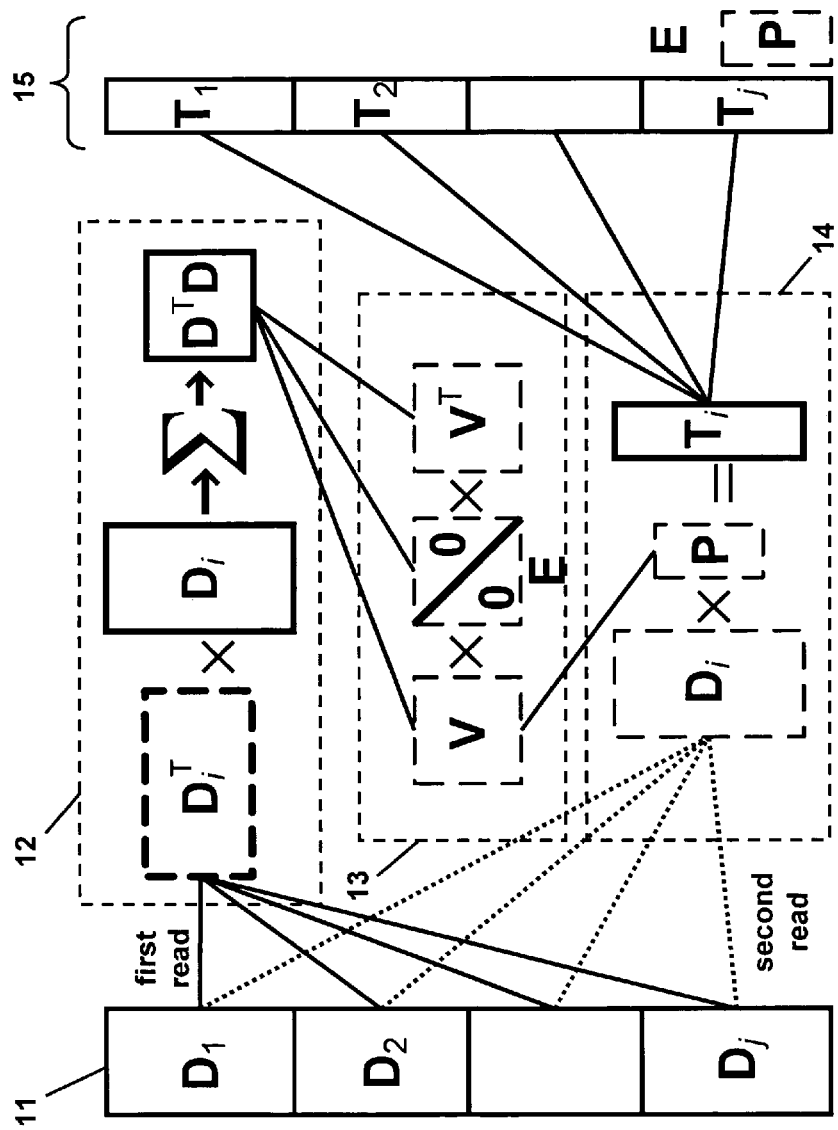
FIG. 4 shows a block algorithm for the spectral compression of a full spectrum image using PCA of the raw spectral data.

FIG. 4 illustrates a spectral compression method for raw or spatially compressed data using the block PCA algorithm for the case that there are more pixels than spectral channels (i.e., m>p). The method comprises a series of sequential steps that can be performed by a computer.

At step 11, the data matrix D, comprising measured spectral data, is provided in disk storage. The data matrix D can comprise j blocks of data $D_i$, according to Eq. (22). Alternatively, a spatially compressed data matrix Đ comprising blocks of compressed data $Đ_i$ can be provided, as described below.

At step 12, a block of data $D_i$ is read from disk a first time into the computer memory. The block is suitably sized to fit in core memory and consists of the full spectral data at some number of pixels.

If a covariance matrix is to be computed, the rows of $D_i$ can be added to an accumulation of the row vectors $\Sigma d_i$. Alternatively, if a correlation matrix is to be computed, the squares of the rows of $D_i$ can be added to an accumulation of the squared row vectors $\Sigma d_i^2$. The data blocks can also be row weighted as shown in Eq. (38).

The block crossproduct matrix $D_i^T D_i$ is computed. The block crossproduct matrix $D_i^T D_i$ is added to an accumulation of the block crossproduct matrices $\Sigma D_i^T D_1$. If all j of the data blocks have not been read in, another data block is read in, another block crossproduct matrix is computed and added to the accumulation until all of the block crossproduct matrices have been accumulated, according to Eq. (23), to provide the crossproduct matrix $D^T D$.

If the crossproduct matrix is to be transformed, the column-wise means of the data matrix d can be computed from the accumulated rows $\Sigma d_i$, according to Eq. (34). The covariance matrix $Z_{cov}$ can then be computed, according to Eq. (32). Alternatively, the column-wise standard deviations of the data matrix s can be computed from the accumulated squared rows $\Sigma d_i^2$, according to Eq. (35). The correlation matrix $Z_{cor}$ can then be computed, according to Eq. (33). If the data is to be column-weighted, the weighted crossproduct matrix can be computed according to Eq. (36).

At step 13, an eigenanalysis of the crossproduct matrix $D^T D$ is performed. The eigenvectors V and eigenvalues E of the crossproduct matrix $D^T D$ are calculated, according to Eq. (11). Alternatively, the eigenvalues of the covariance matrix $Z_{cov}$, or correlation matrix $Z_{cor}$, can be computed and sorted.

If spectral compression of the PCA factors is desired, a best rank r can be determined from the eigenvalues E. A ranked loadings matrix $\tilde{P}$ can be constructed from V based on the number of factors r desired in the model, according to Eq. (9).

At step 14, a scores block $T_i$ is computed by re-reading a data block $D_i$ and computing the product of $D_i$ and P, according to Eq. (24). When using the ranked loadings matrix $\tilde{P}$, a ranked block $\tilde{T}_i$ of the scores matrix can be computed.

At step 15, a PCA-factored representation of the data is provided, comprising the conformable block scores matrix T, obtained by accumulating the scores blocks $T_i$, according to Eq. (22); the loadings matrix P; and the eigenvalues E. Preferably, the ranked scores and loading vectors matrices $\tilde{T}$ and $\tilde{P}$ are truncated to contain only those vectors corresponding to the r significant eigenvalues.

Alternatively, a data set may be provided wherein the data matrix D has already been factored into the product of two matrices, according to Eq. (12). Such factorization can be done on the full data matrix on a large computer or blockwise on a smaller computer using the algorithms presented herein. The factorization can also be effected in an adaptive manner, in which case the full data matrix may never be available, even in principle. Those skilled in the art will recognize that the spectral compression methods can be applied to any factored representation of the data, such as spectrally compressed scores and loading matrices, rotated PCA factors, MCR factors, etc.

Figure 5:
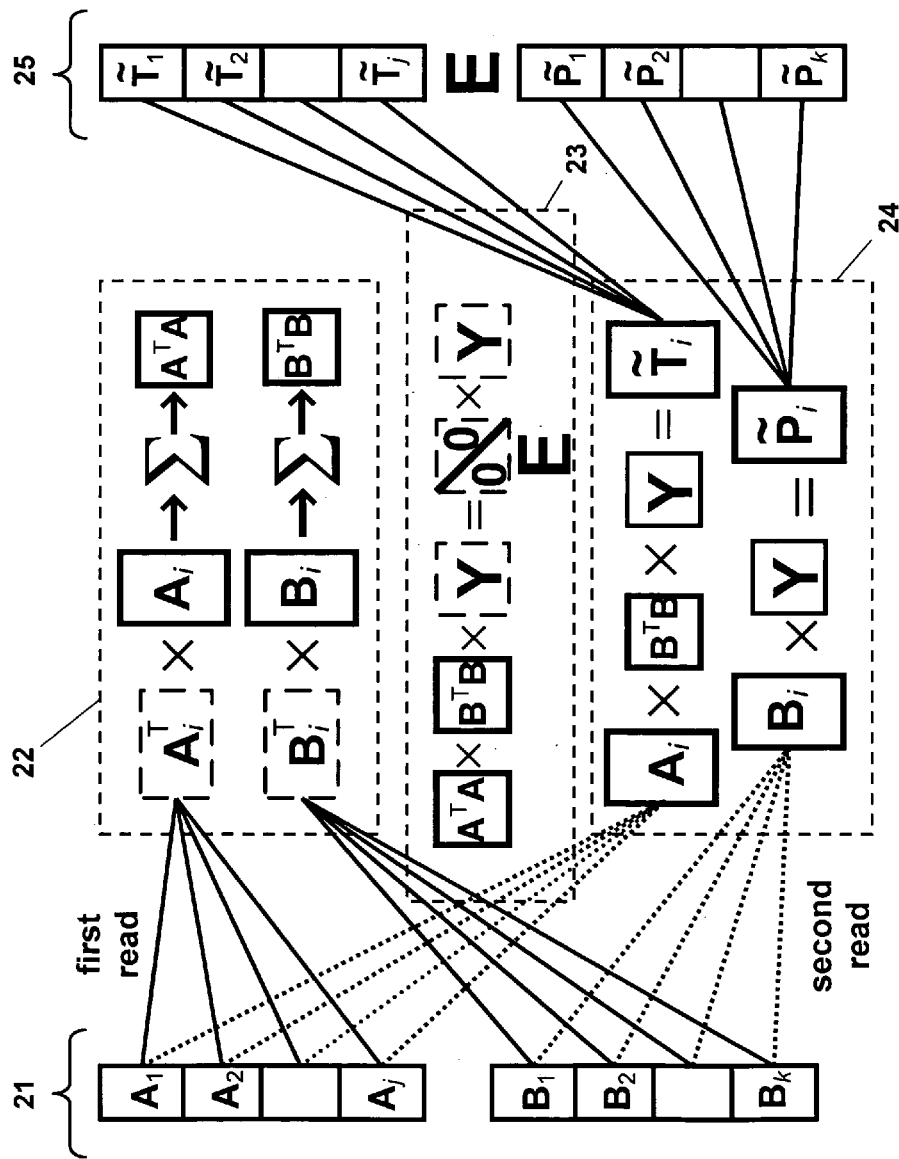
FIG. 5 shows a block algorithm for the spectral compression using PCA of a factored representation of the data.

In FIG. 5 is shown a method for obtaining the spectrally compressed scores matrix $\tilde{T}$ and loading matrix $\tilde{P}$ from the data factor matrices A and B. For example, the data factor matrices A and B can be an uncompressed scores matrix T and an uncompressed matrix P of loading vectors. The method comprises a series of sequential steps that can be performed on a computer.

At step 21, the data factor matrices A and B are provided. These matrices can be written as conformable block matrices, as in Eqs. (26) and (28). Therefore, the data factor matrix A can comprise j blocks of data factors $A_i$ and the data factor matrix B can comprise k blocks of data factors $B_j$.

At step 22, a block of data factors $A_i$ is read from a disk into the computer memory. The block is suitably sized to fit in core memory. The transpose of the data factor block $A_i^T$ is computed and the block crossproduct data factor matrix $A_i^T A_i$ is computed. The block crossproduct data factor matrix $A_i^T A_i$ is added to an accumulation of the block crossproduct data factor matrices $\Sigma A_i^T A_i$. If all j of the data factor blocks have not been read in, another data factor block is read in, another block crossproduct data factor matrix is computed and added to the accumulation until all of the block crossproduct data factor matrices have been accumulated, to provide the crossproduct data factor matrix $A^T A$, according to Eq. (27). Similarly, a block of data factors $B_i$ is read in, a block crossproduct data factor matrix $B_i^T B_i$ is computed, and the block crossproduct data factor matrices are accumulated to provide the crossproduct data factor matrix $B^T B$, according to Eq. (29).

At step 23, an eigenanalysis of the crossproduct matrix $A^T A \times B^T B$ is performed, according to Eq. (13). The generalized eigenvectors Y and eigenvalues E of the crossproduct matrix are calculated. The most significant eigenvectors $V_f$ of $D^T D$ can be determined, according to Eq. (14).

At step 24, a r-component PCA model for D, given $r \leq f$, can then be computed according to Eqs. (15) and (16).

At step 25, an r-component, PCA-factored representation of the data is provided, comprising the ranked scores matrix $\tilde{T}$, the ranked blocked loadings matrix $\tilde{P}$, and the r significant eigenvalues E.

To obtain chemically recognizable solutions for the concentration and spectral shapes matrices, image analysis can be performed on the PCA-factored representation of the data. Spectral image analysis techniques suitable for the present invention include PCA, weighted SVD, MCR-ALS, or other multivariate analysis techniques known to those skilled in the art. See, e.g., Kotula et al., "Automated Analysis of SEM X-Ray Spectral Images: A Powerful New Microanalysis Tool," *Microscopy and Microanalysis* 9, 1 (2003).

Figure 6:
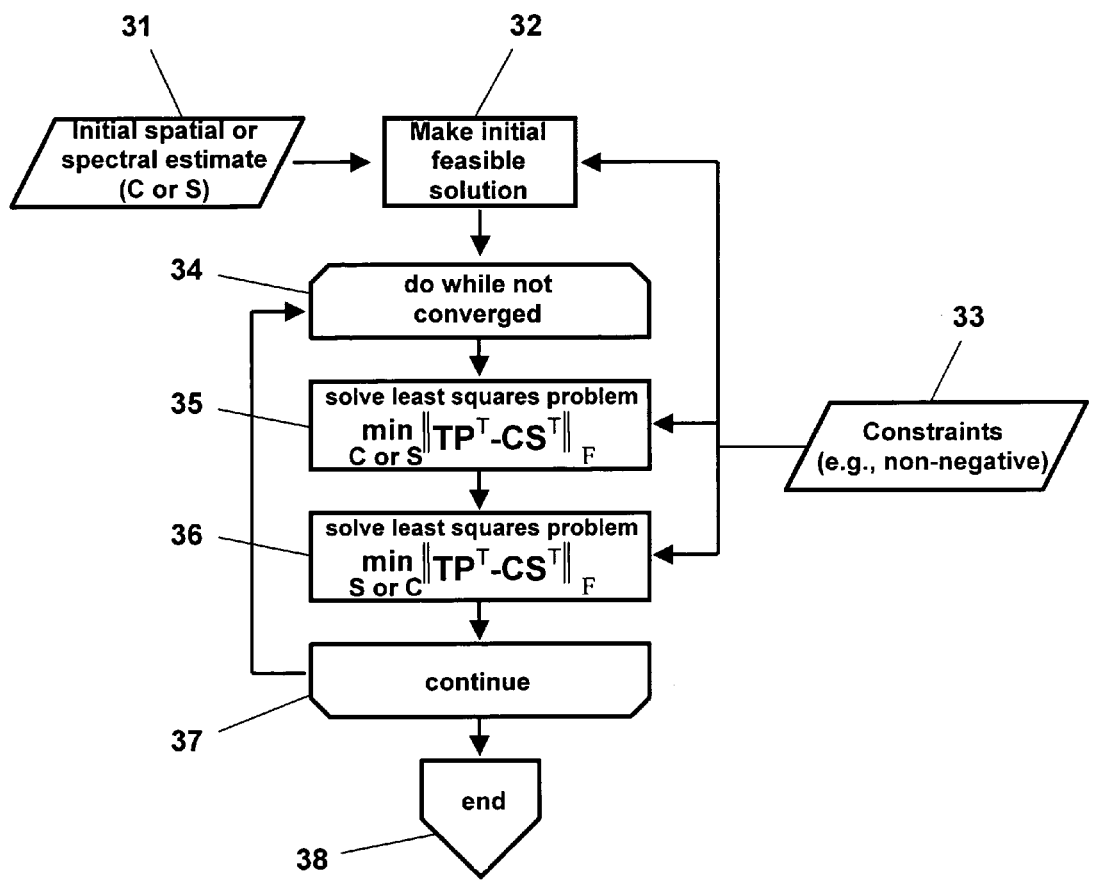
FIG. 6 shows a method for the image analysis of a PCA-factored representation of the data using MCR-ALS.

A preferred spectral image analysis technique is MCR-ALS. In FIG. 6 is shown a method for the image analysis using MCR-ALS that can be applied to the PCA-factored representation $TP^T$ (or the spectrally compressed, r-component PCA-factored representation $\tilde{T}\tilde{P}^T$).

At step 31, an initial spatial estimate is made for the concentration matrix C. This provides an initial feasible estimate for the spectral shapes matrix S at step 32.

At step 35, a least squares solution for C can be computed from Eq. (18), using the PCA-factored representation of the data $TP^T$ (or r-component PCA-factored representation $\tilde{T}\tilde{P}^T$) and the initial feasible estimate for S, subject to constraints at step 33.

At step 36, a least squares solution for S can be computed from Eq. (19), using the PCA-factored representation of the data $TP^T$ (or r-component PCA-factored representation $\tilde{T}\tilde{P}^T$) and the least squares solution for C from step 35, subject to constraints at step 33.

At step 37, a convergence metric is computed and compared to a convergence criterion. If the convergence metric is not less than the convergence criterion, the procedure is returned to step 34 with the updated least squares solutions for S and C and steps 35 and 36 are repeated.

If the convergence metric is less than the convergence criterion at step 37, an acceptable level of convergence is achieved and a least squares solution for S and C is provided at step 38.

Alternatively, the roles of C and S can be easily interchanged by providing an initial feasible estimate for C at step 32 and first solving for S at step 35.

Implementation of the Block PCA Algorithm

The block PCA algorithm outlined in the previous section has been implemented and applied to several data sets ranging in size from $1024^2$ to $1024^3$ (~$10^6$ to ~$10^9$) individual data elements. A C-language implementation of the algorithm was constructed using the Microsoft Visual C++ compiler and it makes extensive use of the Intel Math Kernel and Performance Primitives libraries for performing the linear algebra operations. The Intel library contains versions of the BLAS and LAPACK routines that are optimized for Intel processors. All calculations were performed using single precision floating point arithmetic. In designing the implementation, care was taken to select block sizes that made efficient use of the cache and main memory available in the system. All of the example data sets represent energy dispersive x-ray spectrum images as acquired in a scanning electron microscope. The data are stored on disk in a compressed format and were read into the PCA program using a dynamic link library supplied by the manufacturer. The calculations were all performed on a Dell Precision 420 Workstation containing a Pentium III processor running at 1 GHz with 1 Gbyte of main memory.

Figure 7:
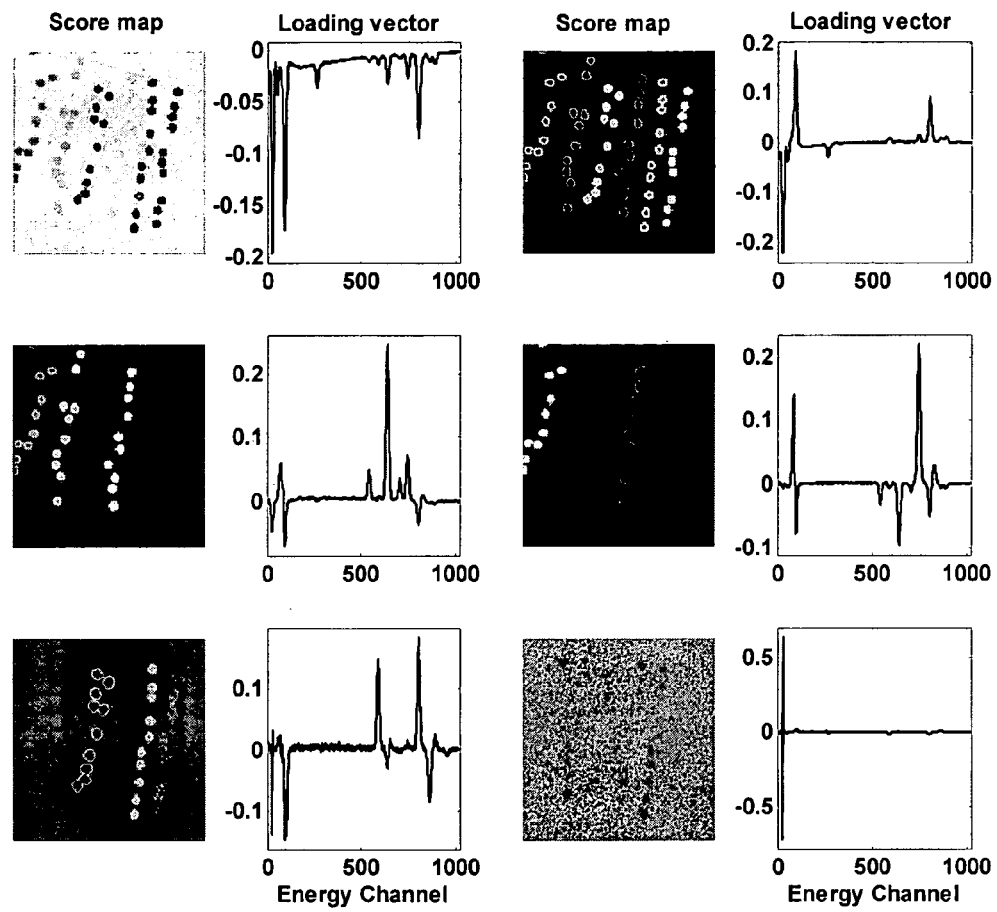
FIG. 7 shows the first six loading vectors and corresponding score maps from standard PCA of the energy dispersive x-ray (EDX) image of a series of wires of varying composition embedded in an epoxy block. The images are 128×128 pixels in size.

In FIG. 7 is shown the first six principal components obtained from a PCA analysis of one of the spectrum images (data set "B" in Table 1). The analysis was performed on the unweighted data matrix. The sample consisted of series of wires having varying composition embedded in an epoxy block, which was then cross-sectioned and imaged with EDX. The first five components clearly represent the chemical information present in the data set while the sixth and subsequent components seemingly represent noise. Using the C-language implementation of the block PCA algorithm, all 1024 principal components of this data set were computed in 50 sec. By way of comparison, computation of PCA using SVD in MATLAB required 599 sec. for the same data. For the significant components, the block PCA algorithm and SVD yielded results that are the same within numerical precision.

Figure 8:
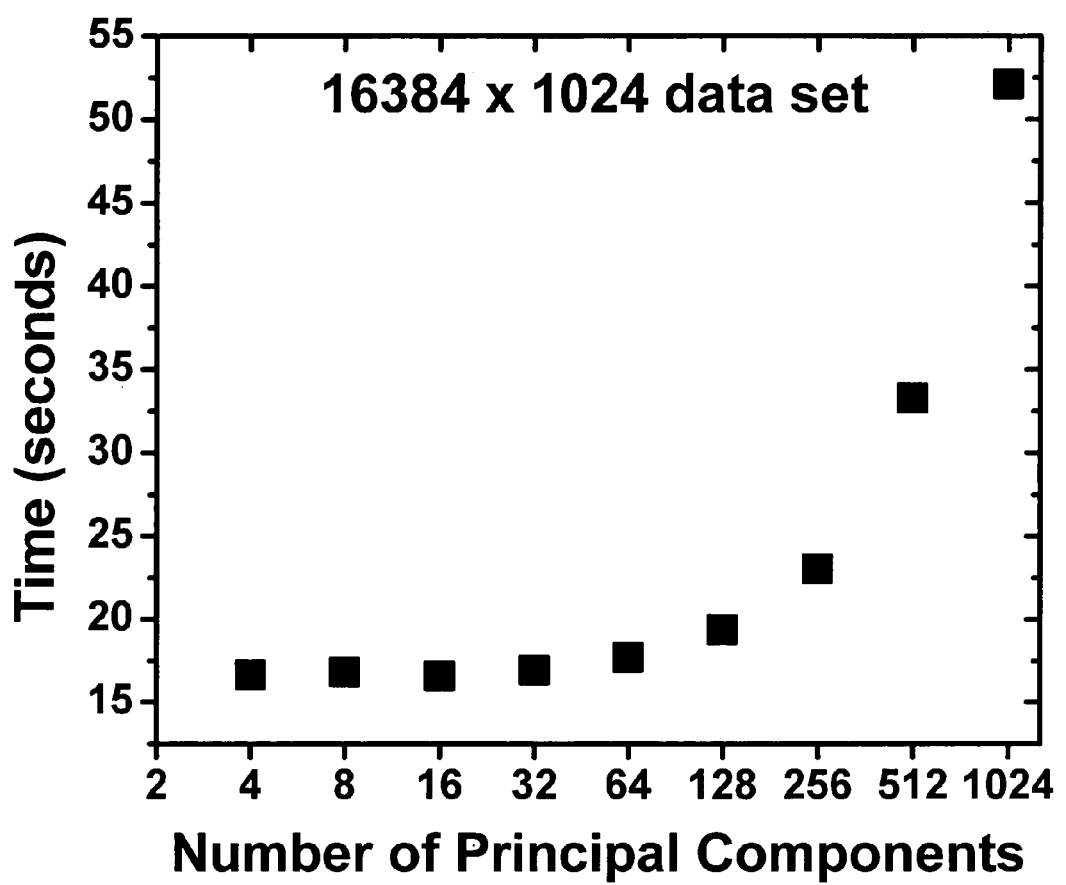
FIG. 8 shows the time required to compute a truncated PCA model for the wires image as a function of the number of principal components to be retained in the model.

In this data set, as is typical of full spectrum images, the number of principal components representing noise greatly outnumbers the chemically relevant principal components. This provides an opportunity to spectrally compress the data substantially by truncating the score and loading matrices to contain only those vectors corresponding to significant singular values (or eigenvalues). For purposes of compression it is not necessary to know exactly how many significant components are needed to represent the chemical information, but rather, to have an upper limit to that number. See R. Bro and C. Andersson, "Improving the speed of multi-way algorithms: Part II: Compression," *Chemometrics and Intell. Lab. Syst.* 42, 105 (1998). To evaluate the penalty exacted by computing more than the absolute minimum number of components, the time to compute truncated PCA models of varying size for data set "B" was measured. The results are shown in FIG. 8. These results indicate that computation time is relatively insensitive to the model size for small numbers of components. This is reasonable since the time required to read the full data set and to compute the crossproduct matrix is independent of model size and is the dominant calculation for small models.

Table 1 summarizes the results of timing the block PCA algorithm while computing 100-component PCA models for data sets varying in size by a factor of over 1000. The times required to complete each of the major subparts of the algorithm are also listed. These include reading the data from disk, forming the data crossproduct matrix, performing an eigenanalysis of the crossproduct matrix, reading the data a second time, if necessary, and projecting the data into the subspace defined by the loading vectors to compute the scores. It should be noted that the time required to read the data from disk a second time when a data set is larger than can be held in memory is the only cost that is unique to the out-of-main-memory algorithm. In other words, the times required for the other four steps will be the same irrespective of whether of not the full data set can be contained within main memory. In general, the computation times scale as expected for the case that the number of pixels is greater than or equal to the number of spectral channels. Reading the data and projecting the data onto the loading vectors takes time approximately proportional to the data size (m×p). Forming the crossproduct matrix, on the other hand, takes time proportional to the number of pixels and proportional to the square of the number of channels (m×p$^2$). Finally, eigenanalysis requires time proportional to the cube of the number of channels (p$^3$). Based on the computational complexities of the subtasks, it would be expected that for sufficiently large images, formation of the crossproduct matrix should become the dominant step in the calculation. This was observed, in practice, as shown in Table 1. It is also noteworthy that for all of the images analyzed, the time to compute the crossproduct matrix was substantially larger than the time required to read the data from disk. This belies our intuition that an operation requiring disk access will necessarily be the slow step in an algorithm.

TABLE 1

Times required to compute 100-component PCA models for energy dispersive x-ray images of various sizes. The times are broken down by the major tasks accomplished by the block PCA algorithm.

| Data Set | A | B | C | D | E | F |
|---|---|---|---|---|---|---|
| Number of Pixels | 1024 | 16384 | 65536 | 65536 | 262144 | 1048576 |
| Number of Channels | 1024 | 1024 | 1024 | 2048 | 1024 | 1024 |
| Data Size (Mbyte) | 4 | 64 | 256 | 512 | 1024 | 4096 |
| 1$^{st}$ Read (sec) | 0.23 | 3 | 9.9 | 17.8 | 76 | 260 |
| Form Crossproduct (sec) | 0.66 | 10.7 | 42.7 | 165 | 171 | 682 |
| Eigenanalysis (sec) | 3.4 | 3.3 | 3.4 | 25.7 | 3.4 | 4 |
| 2$^{nd}$ Read (sec) | — | — | — | 0.1 | 6 | 64 |
| Compute Scores (sec) | 0.05 | 0.7 | 2.9 | 5.6 | 11 | 48 |
| Total Time (sec) | 4.3 | 17.7 | 58.9 | 214 | 267 | 1058 |

The remaining discussion of the block PCA algorithm concerns its performance when the data sets are larger than available main memory. As noted above, the only performance penalty incurred by such large data sets arises from the need to read the data from disk a second time. Based on computational complexity arguments similar to those presented above, it would be expected, once again, that as data sets become larger, reading the data becomes relatively less important to the overall computation time. Experimental verification of this expectation is a more difficult here, however, owing to the lack of sufficiently large data sets and the fact that the time required to read given data from disk a second time depends on operating system caching strategies, etc. In the worst case, the time it takes to read the data twice should be no longer than double the time it takes to read the data once. Allowing this, we find that for the two data sets that do require an out-of-main-memory algorithm, data set "E" which is approximately the size of main memory, and data set "F", which is about 4 times larger, the expected trend is observed. Finally, for these two large data sets, the time penalty incurred by the block PCA algorithm amounts to only a few percent of the total analysis time, thus establishing the feasibility of applying such techniques to the solution of very large problems of real chemical interest.

Spatial Compression Using Wavelets

The present invention is directed to spatial compression algorithms, described below. The spatial compression algorithms can be combined with the spectral compression algorithms, described above, that are the subject of the related U.S. patent application Ser. No. 10/772,548, to provide additional computational efficiencies in the analysis of large, high resolution full-spectrum images.

The goal of spatial compression is to map an image into a compressed image containing a smaller number of pixels that retain the original image's information content. Wavelet transforms can provide a multiresolution representation of the image, by hierarchically decomposing it in terms of a coarse overall image and successively finer levels of detail. The efficacy of a multiresolution technique can be judged by the degree of compression achieved during the transformation and the preservation of the information contained in the image following reconstruction or decompression. High compression levels can generally be achieved due to the large amount of redundancy in a typical spectrum image. Additionally, spatial compression is a filtering operation that improves the signal-to-noise ratio of the data. Therefore, working with spatially compressed data can provide a better result while utilizing fewer computer resources.

Such multiresolution techniques are common in conventional image processing. For example, the JPEG2000 (Joint Photographers Expert Group) standard is a transform-based compression method used in digital photography applications. It uses smoothing wavelet filters and coefficient thresholding to separate spatial information according to frequency and orientation. The JPEG2000 wavelet basis is chosen to maximize compression while minimizing distortion as perceived by the human visual system.

However, the JPEG compression technique may be unacceptable for scientific images intended for measurement and analysis. Other sets of basis functions may provide a more efficient and accurate representation of a scientific image. In particular, a basis should be selected that is aligned with the underlying physical model. Most spectroscopic analyses follow Beer's Law, a linear additive model. That is, at each spatial location, the measured spectrum is a linear combination of pure-component spectra.

The Haar wavelet transform is the simplest wavelet basis, comprising a square step. The Haar wavelets provide an excellent basis for the multiresolution processing of spectral images for compositional analysis. Application of the Haar transform to an image results in an overall average approximation of the original image and detail coefficients in order of increasing resolution. Using the Haar basis, the approximation coefficients are obtained simply by co-adding spectra from adjacent pixels. These approximation pixels will also follow the linear additive model and, as long as there is sufficient variation in the compressed data to span the spectral space of the original data, there will be no loss of spectral information. Furthermore, since the Haar basis is orthonormal, the least squares problem can be solved using the wavelet coefficients themselves, without having to reconstruct the data from those coefficients. Although the Haar wavelets provide an excellent basis for chemical analysis, other general wavelet transformations can also be used in the spatial compression algorithm described herein.

Figure 9B:
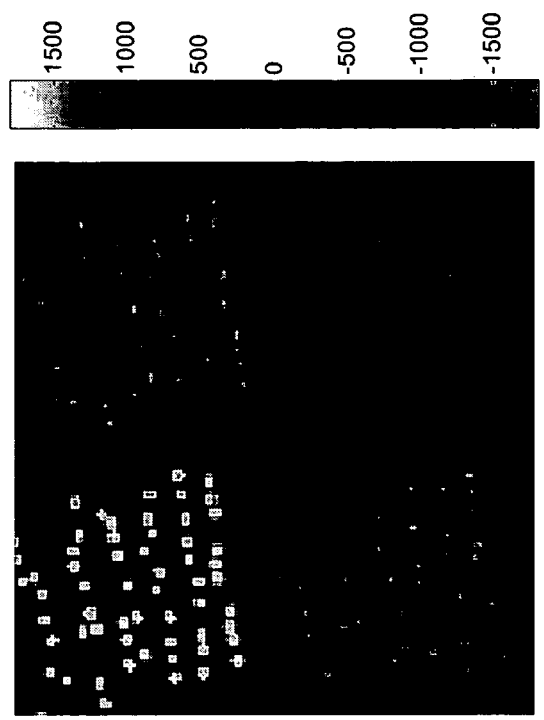
FIG. 9B shows a one-level Haar wavelet transformation of the image into four subimages.
Figure 9A:
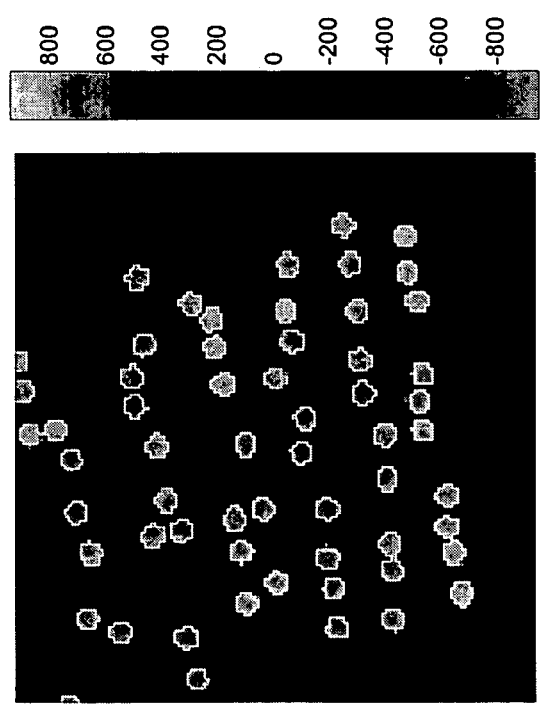
FIG. 9A shows the total spectral intensity image of the cross-sectioned wires embedded in the epoxy block.

In FIG. 9A is shown the EDX image of the cross-sectioned wires embedded in the epoxy block. In FIG. 9B is shown a one-level Haar wavelet transformation of the original image into four subimages by applying low pass (L) and high pass (H) filters to each of the two spatial dimensions. Therefore, the upper left quadrant (LL) of the transformed image provides an overall average, or approximation, of the original image; the lower left quadrant (LH) provides the vertical details; the upper right quadrant (HL) provides the horizontal details; and the lower right quadrant (HH) provides the diagonal details. By thresholding or throwing away (i.e., decimating) the detail coefficients and recursively decomposing the approximation subimages by repeating the filtering process on the low-low pass quadrant of the transformed image, a multiresolution pyramid comprising multiple levels of the approximation subimages can be constructed. Accordingly, very high levels of compression of the original image can be achieved.

As indicated previously, typically the goal of spectrum image analysis is to factor a multidimensional data set $\underline{D}$ into the product of the concentration array C and the transpose of the spectral shapes matrix $S^T$, according to:

$$\underline{D} = \underline{C}S^T \tag{50}$$

For a 3-way data cube, D has the dimensions of m×n×p, C has the dimensions m×n×q and S has dimensions p×q, where m×n is the number of pixels in the two spatial dimensions, p is the number of channels, and q is the number of pure components.

The first step in a typical multivariate image analysis algorithm is to unfold the data cube $\underline{D}$ and the concentration array $\underline{C}$ into the 2D data matrix D and the 2D concentration matrix C according to:

$$D = [vec(D_{\ldots 1}) vec(D_{\ldots 2}) \ldots vec(D_{\ldots p})] \tag{51}$$

and $$C = [vec(C_{\ldots 1}) vec(C_{\ldots 2}) \ldots vec(C_{\ldots q})] \tag{52}$$

then $$\min \|\underline{D} - \underline{C}S^T\|_F = \min \|D - CS^T\|_F \tag{53}$$

which can be solved by normal linear algebra.

Figure 10:
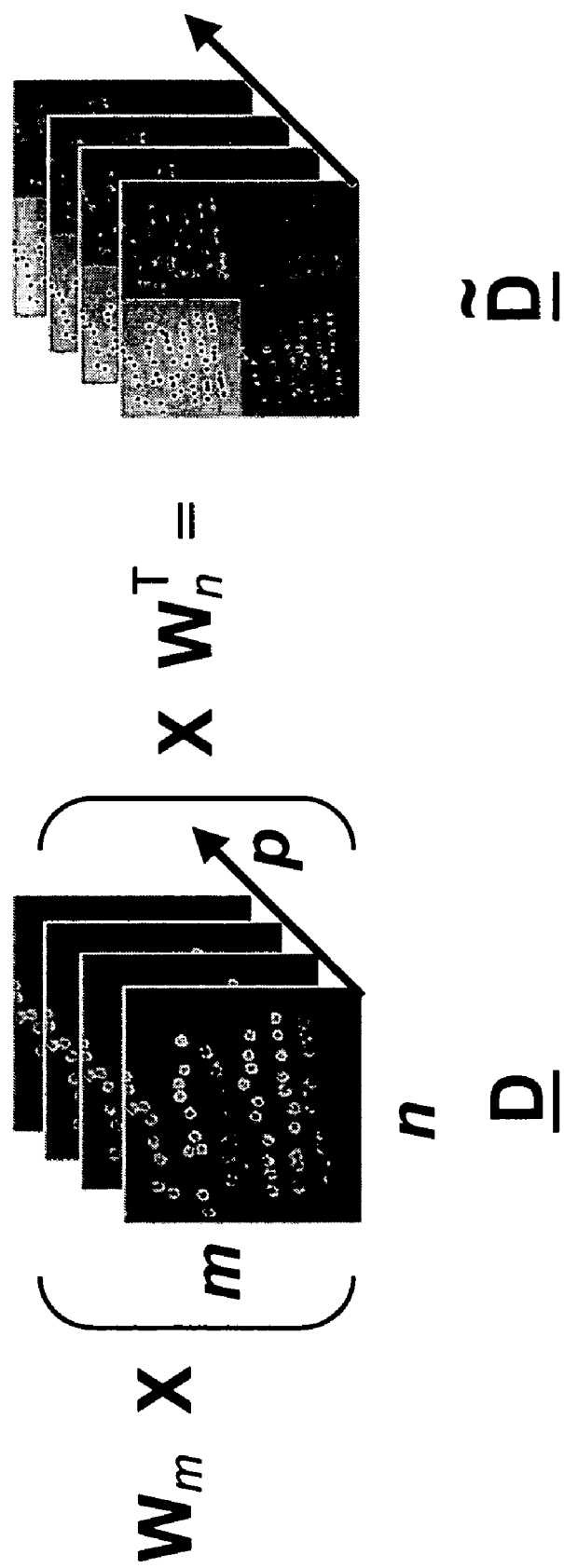
FIG. 10 shows a conceptual representation of a Haar wavelet transformation applied to an m-row×n-column×p-channel data cube.

The Haar transform can be implemented as an orthogonal matrix as:

$$W_l = \frac{1}{\sqrt{2}} \begin{bmatrix} I_{l/2} \otimes [1, 1] \\ I_{l/2} \otimes [1, -1] \end{bmatrix} \tag{54}$$

where I is an identity matrix, $\otimes$ is the Kronecker product, and l is the length of the vector to be transformed. The Haar matrices are applied independently to the rows and the columns of the data matrices. As shown conceptually in FIG. 10, the Haar transform can be applied channel-wise to an m-row× n-column×p-channel data set $\underline{D}$ according to:

$$W_m \times \underline{D}_{\ldots k} \times W_n^T = \tilde{\underline{D}}_{\ldots k} \tag{55}$$

or $$(W_n \otimes W_m) \times vec(D_{\ldots k}) = vec(\tilde{\underline{D}}_{\ldots k}) \tag{56}$$

for the $k^{th}$ image plane. $W_m$ is the wavelet transform across the rows and $W_n^T$ is the wavelet transform down the columns, and each image plane is treated independently. Therefore, the 2D transformed data matrix $\tilde{D}$ can be computed as:

$$(W_n \otimes W_m) \times D = \tilde{D} \tag{57}$$

The Haar transform combines and permutes the elements of the data matrix into wavelet coefficients of an approximation matrix $\tilde{D}_a$ and detail matrices which can be adjoined to form a single detail matrix $\tilde{D}_d$. That is, the wavelet transformation partitions the matrix $\tilde{D}$, according to:

$$\tilde{D} = \begin{bmatrix} \tilde{D}_a \\ \tilde{D}_d \end{bmatrix} \tag{58}$$

Especially if there are not too many sharp edges in the spectral image, most of the information (i.e., energy) will be contained in the approximation coefficients $\mathcal{D}_a$ (i.e., the upper left quadrant in FIG. 9B). The Haar approximation coefficients $\mathcal{D}_a$ simply represent spectral mixing on a broader scale. If the linear additive model holds and there remains sufficient variation in these "super" pixels to span the spectral space, there will be no loss of spectral information by setting $\mathcal{D}_d$ to zero for purposes of spectral image analysis. Of course, prior to setting them to zero, the details can be stored using standard data compression techniques to enable inverse wavelet transformation to recover the concentration maps at the original spatial resolution.

Because the wavelet coefficients for a particular pixel depend solely on the pixels in a small neighborhood surrounding that pixel, only that neighborhood of pixels needs to be in memory at any given time. In the case of the Haar transform, the mapping of the pixel locations in the original image to pixel locations in the compressed image is known a priori for any arbitrary level of compression. Consequently, as each individual spectrum is read, it can be accumulated immediately into the appropriate compressed pixel and then discarded. Therefore, the Haar wavelet transform can be computed on-the-fly, such that the entire data set or image never needs to reside simultaneously in memory. This allows even larger problems to be solved on a given computer and enables faster computations.

Because the wavelet transform is linear and the Haar basis is orthonormal, a least squares analysis can be performed on the wavelet coefficients rather than the image data. By recognizing that $(W_n \otimes W_m)$ is an orthogonal matrix, the MCR-ALS analysis can be accomplished in terms of the transformed data, according to:

$$\min\|D-CS^T\|_F = \min\|(W_n \otimes W_m)(D-CS^T)\|_F = \min\|\tilde{D}-\tilde{C}S^T\|_F \quad (59)$$

subject to transformed constraints. For example, assuming a constraint of non-negativity of concentrations (i.e., $C \geq 0$), the transformed non-negativity constraint becomes:

$$(W_n \otimes W_m)^T \tilde{C} \geq 0 \quad (60)$$

where $\tilde{C}$ is a transformed concentration matrix.

If the detail coefficients are set to zero, the least squares problem in Eq. (59) becomes $$\min\|\tilde{D}-\tilde{C}S^T\|_F = \min\left\|\begin{bmatrix}\tilde{D}_a\\0\end{bmatrix} - \begin{bmatrix}\tilde{C}_a\\\tilde{C}_d\end{bmatrix}S^T\right\|_F = \min\|\tilde{D}_a - \tilde{C}_a S^T\|_F \quad (61)$$

where $\tilde{C}_a$ and $\tilde{C}_d$ represent the contributions to the overall concentration that arise from the wavelet approximation and detail coefficients, respectively. The Haar approximation coefficients are necessarily non-negative also, because they are simply summations of concentration elements that are themselves constrained to be non-negative. Therefore, using the Haar basis and decimating all of the detail coefficients reduces the transformed constraint in Eq. (60) to simple non-negativity (i.e., $\tilde{C}_a \geq 0$).

Therefore, an equivalent solution to the MCR-ALS problem can be obtained working with either the original data or the wavelet coefficients. The advantage of working in the wavelet domain is that most of the spatial information of interest is contained in a few significant wavelet coefficients, much as most of the spectral information is contained in a few principal components in the PCA factoral representation. By thresholding the coefficients, the interesting spatial information can be concentrated in a reduced number of significant wavelet coefficients that is small compared to the number of original pixels. In particular, the MCR-ALS analysis can be performed on a compressed data matrix consisting of only the approximation coefficients. For example, using only the approximation coefficients at level two in both spatial dimensions and decimating the details enables the computation to be performed using only $\frac{1}{16}$ the number of coefficients as original pixels.

Finally, if the individual pixels follow Beer's law, the Haar approximation coefficients do also. Therefore, the approximation coefficients are given, within a normalization factor, as a sum of adjacent pixels. That is, a level one decomposition in both rows and columns results in a summing over a 2×2 pixel neighborhood. From a physical viewpoint, the unmixing problem, or MCR, assumes that the signal arising from adjacent pixels is a linear combination of pure component spectra weighted by the amount of each component in the mixed pixel. As long as the linear model holds and a sufficient number of linearly independent mixtures are retained in the approximation, analysis of the approximation coefficients alone will provide a satisfactory curve resolution or spectral unmixing. A preferred level of compression maximizes the compression while still retaining sufficient variation in the compressed pixels to span the spectral space of the original data. Therefore, good results can generally be obtained as long as the number of compressed pixels remains substantially larger than the number of spectral pure components.

The spatial compression algorithm can also be applied to any arbitrary factored representation of the data, according to Eq. (12), where the data factor matrix A comprises the spatial information and the data factor matrix B comprises the spectral information. The data factor matrix A can be transformed, using a wavelet transform, to provide a transformed data factor matrix $\tilde{A}$. The wavelet coefficients of the transformed data factor matrix $\tilde{A}$ can be spatially compressed by thresholding the wavelet coefficients. An image analysis can be performed using the transformed data factor matrix $\tilde{A}$ and the data factor matrix B to provide a transformed concentration matrix $\tilde{C}$ and a spectral shapes matrix S. A concentration matrix C can then be computed from the transformed concentration matrix $\tilde{C}$. Furthermore, the data factor matrices A and B can be blocked and the concentration matrix C can be accumulated blockwise.

Preferably, the spatial compression algorithm using wavelets can be combined with the spectral compression algorithm to provide even greater computational efficiencies. In summary, the spectrally compressed data can be spatially compressed, according to:

$$\hat{D}=(W_n \otimes W_m)\times \hat{D}=(W_n \otimes W_m)\times \tilde{T}\tilde{P}^T = \tilde{T}\tilde{P}^T \quad (62)$$

Image analysis, preferably using MCR-ALS, can then be applied to the spectrally and spatially compressed data representation $\tilde{T}\tilde{P}^T$, according to:

$$\min\|\hat{D}-CS^T\|_F = \min\|(W_n \otimes W_m)(\tilde{T}\tilde{P}^T-CS^T)\|_F = \min\|\tilde{T}_a \tilde{P}^T - \tilde{C}_a S^T\| \quad (63)$$

subject to appropriate constraints. Again, the detail coefficients have been set to zero.

Image analysis, according to either Eq. (61) or Eq. (63), provides an estimated spectral shapes matrix S, comprising a set of pure component spectra, and a spatially compressed concentration matrix $\tilde{C}_a$. The goal of decompression or reconstruction is to estimate a components map at the full spatial resolution. Such a components map can be obtained from the concentration matrix C.

The concentration matrix C can be computed from the compressed concentration matrix $\mathcal{C}_a$ by inverse wavelet transformation. In this context, $\mathcal{C}_a$ represents the approximation coefficients as transformed into the spectral shapes basis defined by S. Inverse wavelet transformation involves rereading the detail coefficients back into memory and transforming them to the spectral basis defined by S, according to:

$$\mathcal{C}_d = \mathcal{D}_d S \qquad (64)$$

Then, the component maps at full spatial resolution are obtained by performing the inverse wavelet transform:

$$C = (W_n \otimes W_m)^{-1} \times \begin{bmatrix} \tilde{C}_a \\ \tilde{C}_d \end{bmatrix}. \qquad (65)$$

Alternatively, because the spectral shapes matrix S in Eq. (53) is equivalent to the spectral shapes matrix S estimated from the compressed data in Eq. (61) or (63), C can also be computed directly from the original data D (or the PCA-factored representation of the data $TP^T$). Therefore, a preferred approach is to project the original data set D (or the product of T and P) and the estimated spectral shapes matrix S to solve the least squares problem $$\min_C \|D - CS^T\|_F = \min_C \|TP^T - CS^T\|_F \qquad (66)$$

subject to appropriate constraints. This approach is especially useful if the wavelet detail coefficients are discarded.

Furthermore, the solution to Eq. (66) can be obtained by reading the data blocks $D_i$ (or the scores blocks $T_i$) sequentially and solving the least squares problem blockwise. The concentration matrix C can then be accumulated as concentration blocks $C_i$, according to:

$$C = [C_1\ C_2\ \ldots\ C_{j-1}\ C_j] \qquad (67)$$

Therefore, the full spatial and spectral resolution can be achieved in an acceptable MCR-ALS analysis, at the cost of reading the data twice.

Figure 11:
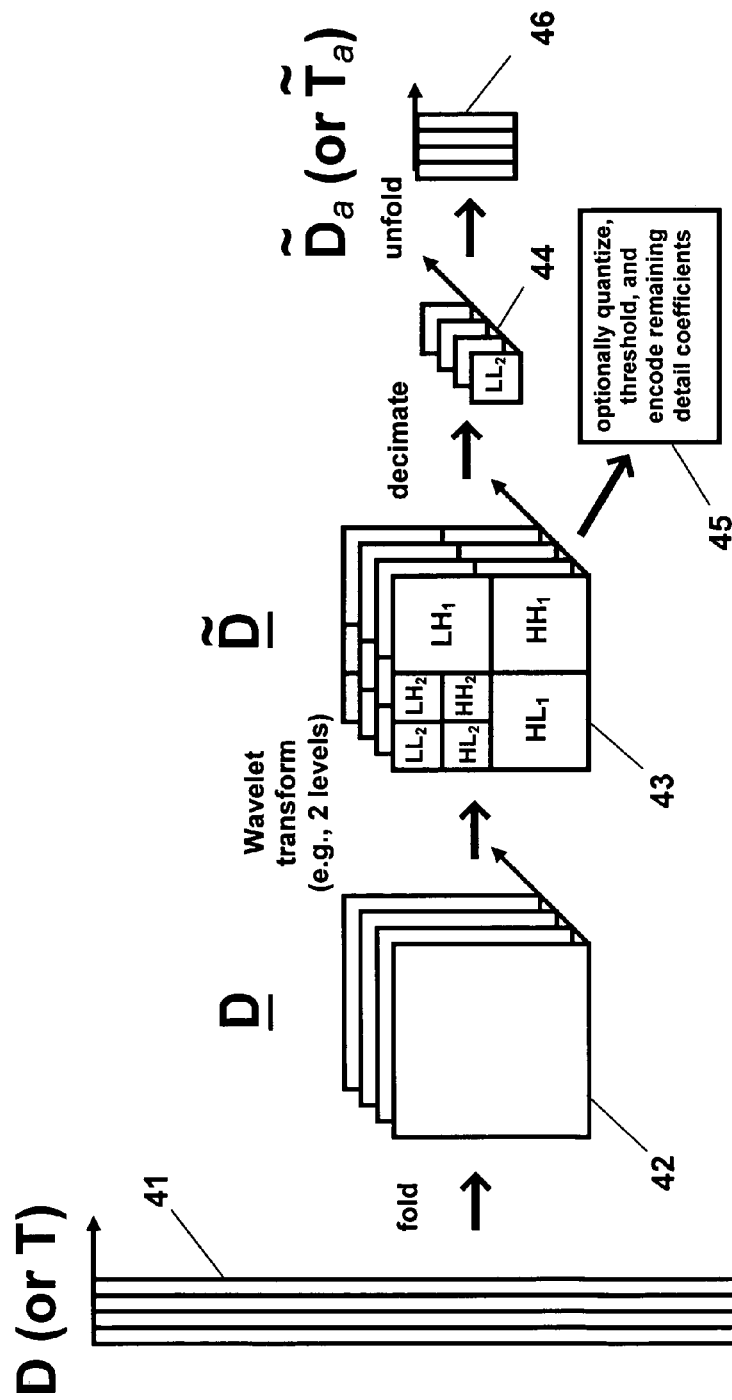
FIG. 11 illustrates conceptually the spatial compression of either raw or a spectrally compressed representation of the data.

FIG. 11 illustrates conceptually a preferred method for the spatial compression of raw or spectrally compressed data using wavelets. The spatial compression will be described as applied to the data matrix D, although those skilled in the art will realize that spatial compression can be applied likewise to the PCA-factored representation of the data $TP^T$ or $\mathcal{T}P^T$. The mapping of a pixel at the original spatial resolution to the corresponding pixel at the compressed resolution can be calculated using a computer. Therefore, the is no need to actually do the folding and unfolding in the computer implementation, as depicted conceptually in steps 42-46. Furthermore, this means that the wavelet transformation can be done blockwise to the data matrix D (or the PCA-factored representation of the data). Those skilled in the art will realize that other manipulations, such as weighting, can also be used with the spatial compression algorithm.

At step 41, the full 2D data matrix D (or a scores matrix T or $\mathcal{T}$) is provided in disk storage. The matrix D can comprise block matrices.

At step 42 is shown conceptually a folded 3-way data cube $\underline{D}$, comprising an m-row×n-column×p-channel data set, that is represented by the data matrix D in step 41, according to Eq. (51).

The wavelet transform can be applied channel-wise to the folded data cube $\underline{D}$, according to Eq. (55), and as illustrated conceptually in FIG. 10. As implemented on a computer, the wavelet transformation would actually be applied to the unfolded data matrix D, according to Eq. (57).

At step 43 is shown an exemplary two-level wavelet transform of the data cube $\underline{D}$, comprising the second-level approximation in the upper left hand quadrant of the second-level transformed subimages (i.e., $LL_2$), the second-level details (i.e., $HL_2, LH_2,$ and $HH_2$), and the first-level details (i.e., $HL_1, LH_1,$ and $HH_1$). Those skilled in the art will realize that arbitrary levels of compression can be applied to the original image.

At step 44, the exemplary second-level transformed image can be decimated by throwing away the first- and second-level details to leave only the second-level approximation coefficients. Additionally, at step 45, the detail coefficients can be quantized, thresholded, and encoded and the retained detail coefficients can be stored.

At step 46, the approximation coefficients can be unfolded to provide the spatially compressed 2D data matrix $\mathcal{D}_a$ (or $\mathcal{T}_a$).

The spatially compressed data matrix $\mathcal{D}_a$ can be analyzed by standard image analysis methods. Preferably, MCR-ALS is performed on the spatially compressed data set $\mathcal{D}_a$, or the spatially compressed PCA-factored representation of the data $\mathcal{T}_a P^T$, to provide a spectral shapes matrix S and a compressed concentration matrix $\mathcal{C}_a$, according to Eq. (61) or (63).

Figure 12:
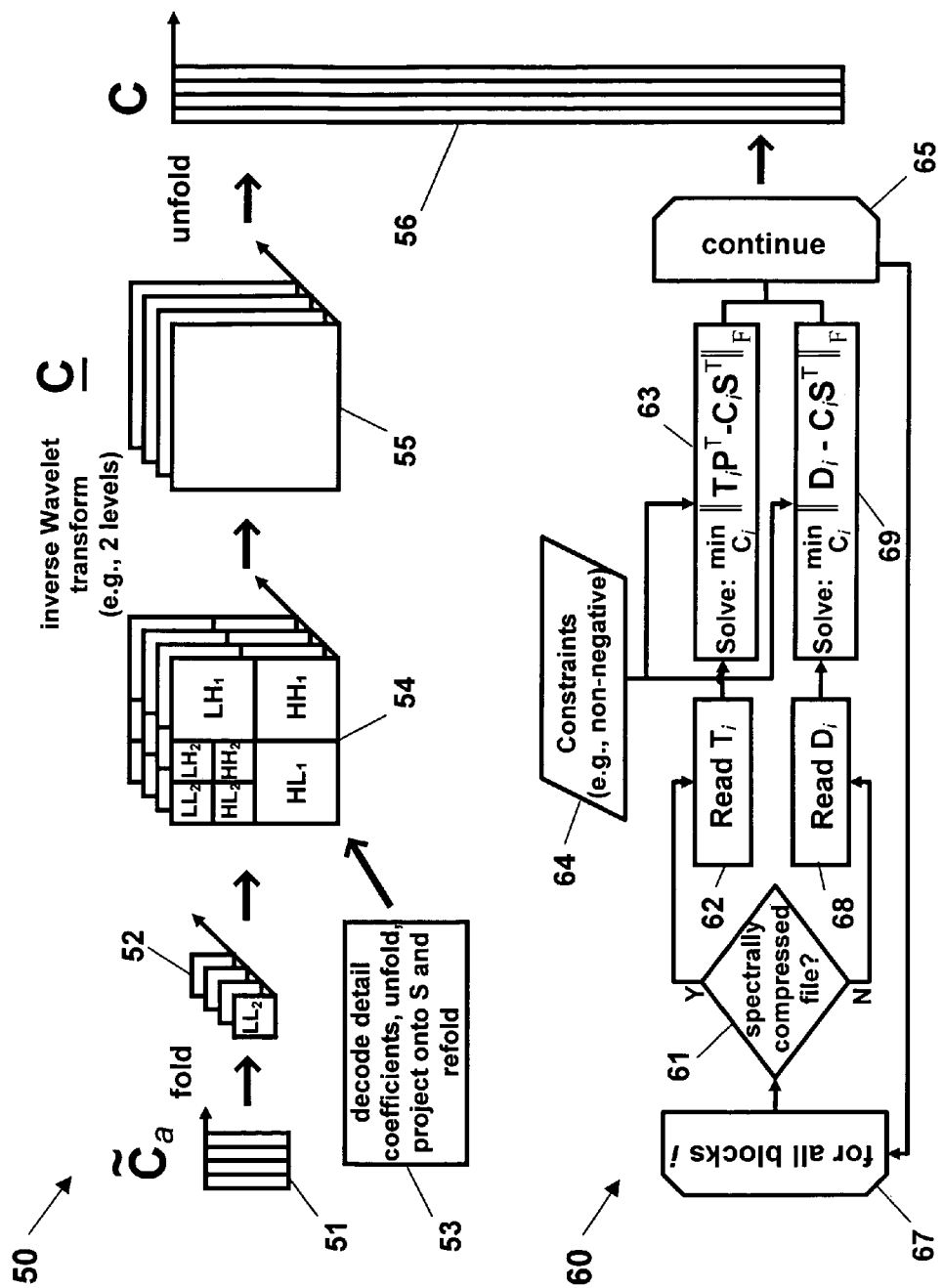
FIG. 12 illustrates conceptually two methods for obtaining the component maps at full resolution from the image analysis of the compressed data.

In FIG. 12 is shown conceptually two methods for computing the concentration matrix C from the spatially compressed data and reconstructing the component maps at full spatial resolution.

In method 50, the compressed concentration matrix $\mathcal{C}_a$ is decompressed using an inverse wavelet transform to obtain the concentration matrix C. Since the mapping of pixels can be done on a computer, there is no need to actually do the folding and unfolding, as depicted conceptually in steps 52-56, in the computer implementation.

At step 51, the compressed concentration matrix $\mathcal{C}_a$ is provided.

At step 52 is shown conceptually the folded second-level approximation subimages (i.e., $LL_2$) of the compressed concentration matrix $\mathcal{C}_a$.

At step 53, the stored detail coefficients are decoded, unfolded, projected onto S, and refolded.

At step 54, the refolded concentration details (i.e., $HL_2, LH_2, HH_2, HL_1, LH_1,$ and $HH_1$) are added to the second-level approximation subimages to provide the second-level images of the compressed concentration matrix.

At step 55, the inverse wavelet transformation is applied to the second-level compressed concentration matrix to provide the folded concentration array $\underline{C}$.

At step 56, the folded concentration array $\underline{C}$ is unfolded to provide the concentration matrix C, according to Eq. (52). A component map can be reconstructed from the concentration matrix C.

In method 60, the concentration matrix C is computed by projection of the data matrix D (or the PCA-factored representation of the data matrix $TP^T$) onto the estimated spectral shapes matrix S.

At step 61, if the data has been spectrally compressed and the analyst is working with a PCA-factored representation of the data $TP^T$, the analyst proceeds to step 62. If the analyst is working with the original data set D, the analyst proceeds to step 68.

At step 62, a scores block $T_i$ of a total of j scores blocks is read into memory.

At step 63, a least squares solution is obtained for a concentration block $C_i$ by projecting the product of the scores block $T_i$ and P onto the estimated spectral shapes matrix S, according to Eq. (66) and subject to constraints at step 64.

At step 65, the concentration blocks $C_i$ are accumulated.

At step 67, the steps 61-65 are repeated until all of the j scores blocks have been read into memory and all j concentration blocks have been accumulated.

At step 56, the concentration matrix C is provided from the accumulation of concentration blocks, according to Eq. (67). A component map can be reconstructed from the concentration matrix C.

Alternatively, at step 61, if the analyst is working with the original data set D, the analyst proceeds to step 68.

At step 68, a data block $D_i$ of a total of j data blocks is read into memory.

At step 69, a least squares solution is obtained for a concentration block $C_i$ by projecting the data block $D_i$ onto the estimated spectral shapes matrix S, according to Eq. (66) and subject to constraints at step 64.

At step 65, the concentration blocks $C_i$ are accumulated.

At step 67, the steps 61-65 are repeated until all j data blocks have been read into memory and all j concentration blocks have been accumulated.

At step 56, the concentration matrix C is provided from the accumulation of concentration blocks, according to Eq. (67). A component map can be reconstructed from the concentration matrix C.

Implementation of the Spatial Compression Algorithm

Figure 13B:
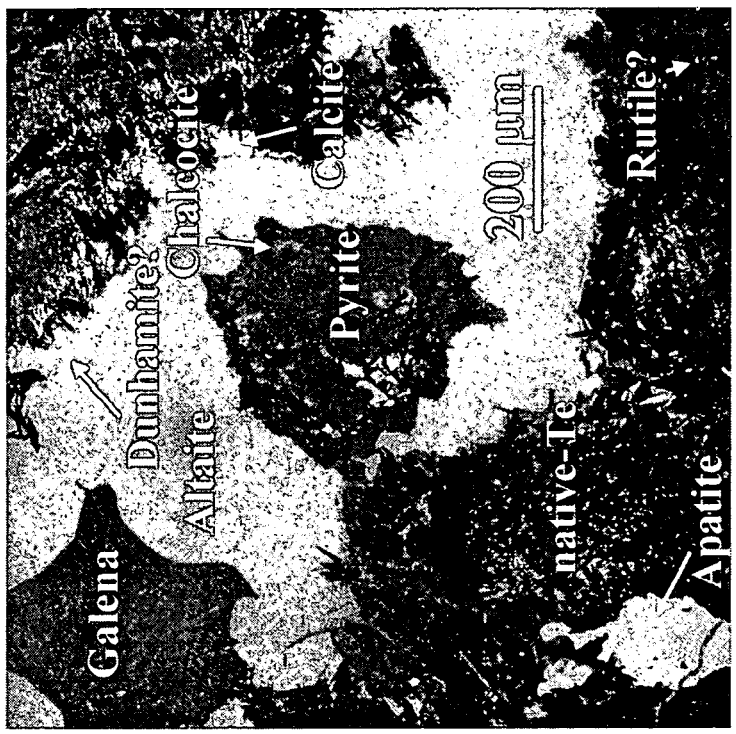
FIGS. 13A-13D show a MCR-ALS analysis of a spatially compressed EDX image of a complex geological material.
Figure 13A:

FIGS. 13A-13D show an example of the MCR-ALS analysis of a spatially compressed energy dispersive X-ray (EDX) image of a complex geological material. FIG. 13A shows a scanning electron micrograph (SEM) of the geological sample, which is a primary tellurium ore in the form of PbTe. Expert geological examination indicated that this material contained about thirteen distinct chemical phases. EDX spectrum images were acquired for a 1 mm field of view of the sample at a 512×512 pixel resolution (i.e., a resolution of about 2 μm per pixel). A 1024-channel spectrum was collected at each pixel, with about 100 counts per spectrum on average. This resulted in an approximately 1 Gbyte data set in single precision floating point numbers.

The EDX spectrum images were spatially compressed to the level four approximation in both spatial dimensions and analyzed at a 32×32 resolution. The MCR-ALS analysis of the spatially compressed data was completed in about 3 minutes on a 1 GHZ computer having a single Gbyte of main memory. In FIG. 13B is shown the results of the MCR-ALS analysis of the compressed data. The analysis gave excellent, physically meaningful results consistent with the expert geological examination. Using both spatial and spectral compression, the complex geological sample was analyzed in less than two minutes.

Figure 13D:
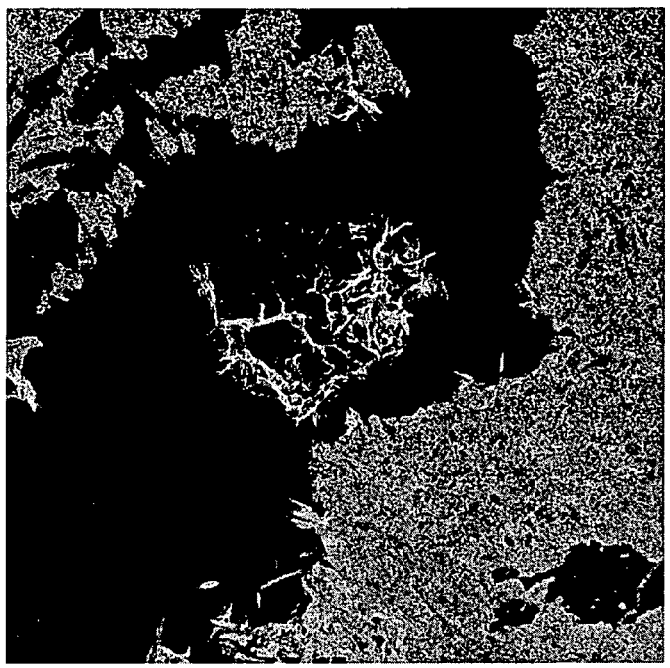
Figure 13D:
Figure 13C:
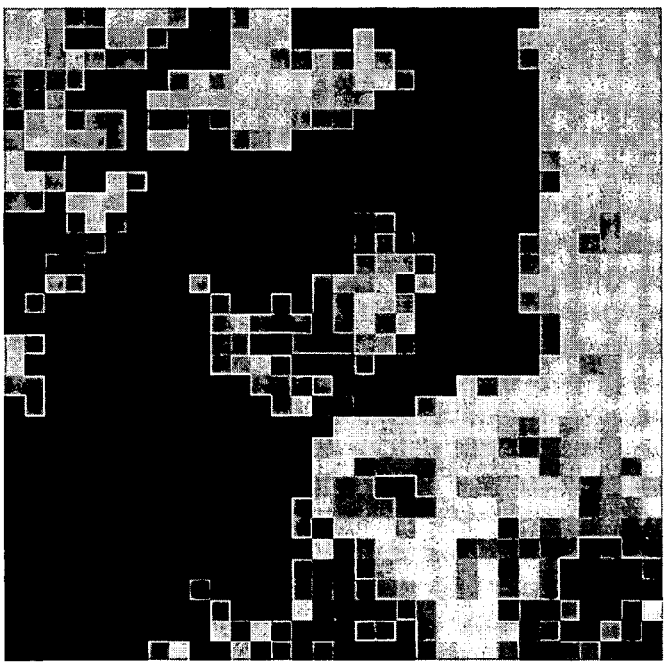
Figure 13C:
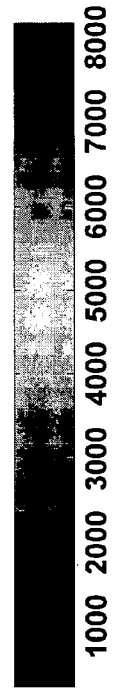

The MCR-ALS analysis with spatial compression retains the fine spatial details of the original image. In FIGS. 13C and 13D are shown the analysis of the silicate component in the geological sample. FIG. 13C shows the 32×32 pixel compressed data image of the silicate component that was analyzed by MCR-ALS. FIG. 13D shows the reconstructed silicate image after projection of the original data onto the estimated spectral shapes matrix derived from the MCR-ALS analysis of the compressed data matrix. The reconstructed image of the silicate component map retains the full spatial resolution of the original data.

An additional benefit that can be obtained using wavelets is improved sensitivity to the pure spectral components. By co-adding pixels to provide the approximation coefficients, the signal-to-noise ratio can be improved. For a homogeneous region, the improvement will go as the square root of the number of pixels added. Therefore, high-resolution images collected at a low signal-to-noise (S/N) ratio can achieve results equivalent to low spatial resolution, high S/N images.

Figure 14:
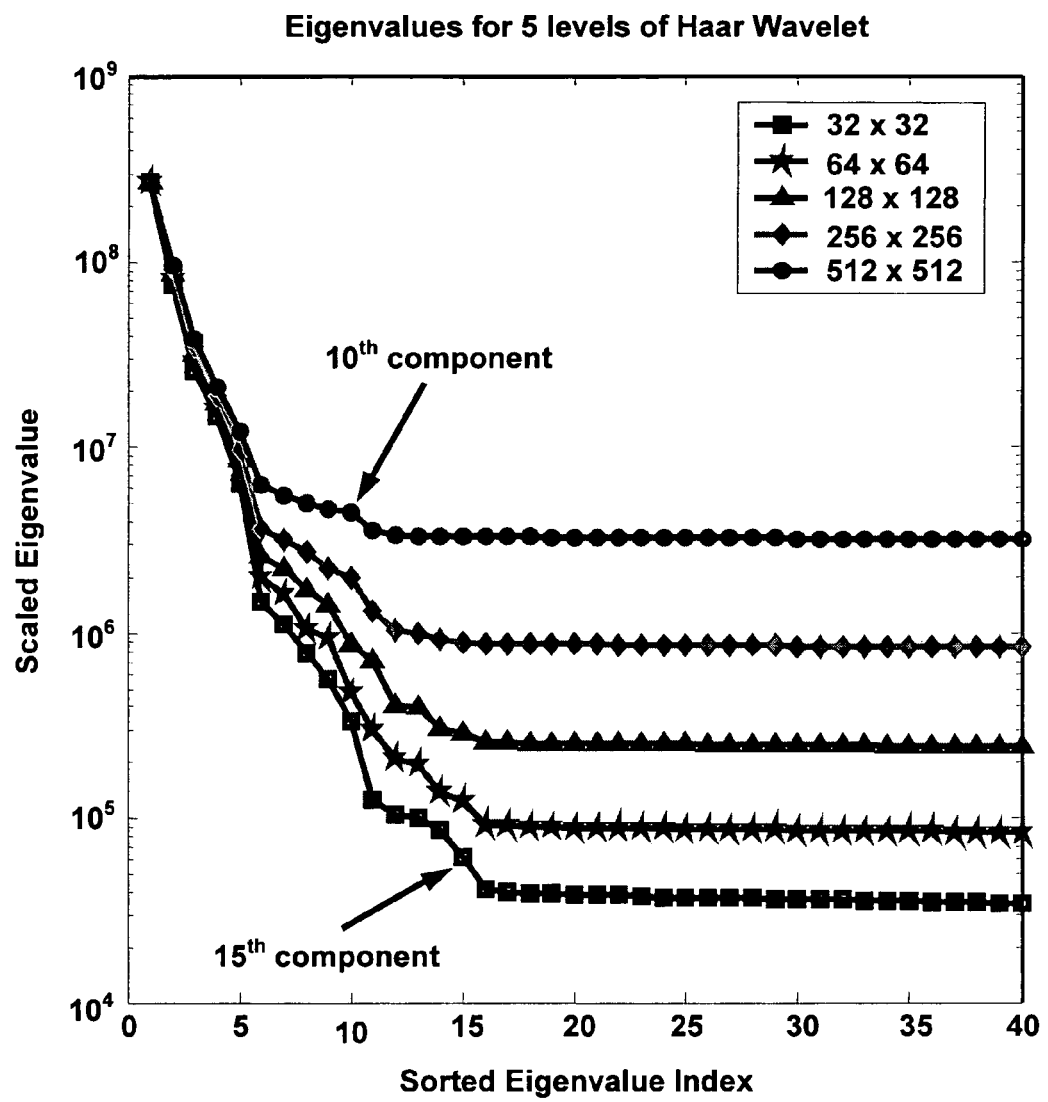
FIG. 14 shows scaled eigenvalues for the sorted principal components of the uncompressed image of the geological sample and of four levels of compression using Haar wavelets.

FIG. 14 shows scaled eigenvalues for the sorted principal components of the uncompressed image of the geological sample and four levels of Haar wavelet decomposition in both spatial dimensions. In such a plot, eigenvalues representing noise components should fall on a nearly horizontal line. Components representing systematic chemical variation in addition to noise cause a positive deviation from the line. Thus, the number of chemically relevant factors can be estimated by finding the break in the eigenvalue plot. Ten principal components representing chemical information could be detected by MCR-ALS analysis of the uncompressed 512× 512 data set. Additional pure components could be detected by analysis of the spatially compressed images. For example, 15 pure components were detected at a level two and higher compression (i.e., a 32×32, 64×64, or 128×128 approximation image). In these cases, the improved S/N resulting from spatial compression has enabled the signal arising from minor chemical components to become significant with respect to noise.

Figure 15:
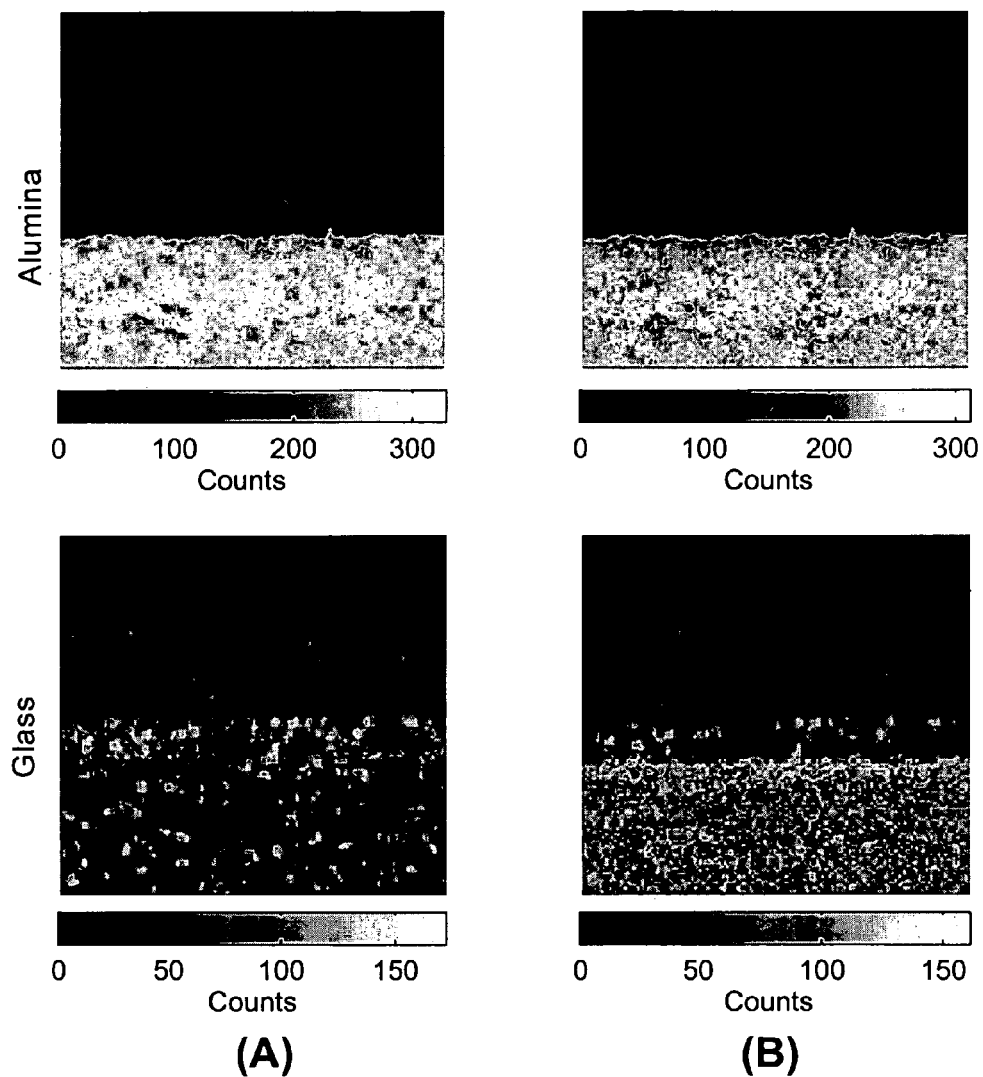
FIGS. 15A and 15B show MCR-ALS analysis of an alumina/braze interface.

Furthermore, because the discrete wavelet transform is separable, the rows and columns can be treated separately. Therefore, the spatial filter can be matched to the spatial characteristics of the sample. FIGS. 15A and 15B show partial results from MCR-ALS analysis of an EDX spectral image of an alumina/braze interface. FIG. 15A shows two components, the alumina phase and an interspersed glass particulate phase, when analyzed at the original, uncompressed 128×128 resolution. FIG. 15B shows the two corresponding components obtained after spatially compressing the spectral image to level seven along the rows, but remaining uncompressed down the columns (i.e., a 128×1 approximation image). Such an asymmetric filter improves sensitivity to features that look like horizontal lines. In the case of the braze interface, applying this asymmetric filter has enabled the detection of a real, differential self-absorption process occurring at the interface. At the same time, spectral contrast arising from the glass particulates has been reduced since the small globular shapes of the particulates are spatially mismatched to a horizontal line.

It will be understood that the above description is merely illustrative of the applications of the principles of the present invention, the scope of which is to be determined by the claims viewed in light of the specification. The invention has been described as an efficient spatial compression algorithm for the analysis of very large multivariate images. Other variants and modifications of the invention will be apparent to those of skill in the art.

I claim:

1. A method for analyzing multivariate images, comprising:
   a) providing a data matrix D containing measured spectral data, b) applying at least one wavelet transform to the data matrix D to obtain a transformed data matrix Đ comprising an approximation matrix $Đ_a$ and a detail matrix $Đ_d$, c) performing an image analysis on the approximation matrix $Đ_a$ to obtain an approximation concentration matrix $Ȼ_a$ and a spectral shapes matrix S, and d) computing a concentration matrix C from the approximation concentration matrix $Ȼ_a$, the detail matrix $Đ_d$, and the spectral shapes matrix S.

2. The method of claim 1, wherein the at least one wavelet transform comprises a Haar transform.

3. The method of claim 1, wherein the image analysis of step c) comprises an alternating least squares analysis and the approximation concentration matrix $Ȼ_a$ and the spectral shapes matrix S are obtained from a constrained least squares solution of $\min\|Đ_a - Ȼ_a S^T\|_F$.

4. The method of claim 3, wherein the alternating least squares analysis comprises a transformed non-negativity constraint $Ȼ_a \geq 0$.

5. The method of claim 1, wherein the computing step d) comprises:

computing a detail concentration matrix $Ȼ_d$ from the detail matrix $Đ_d$ and the spectral shapes matrix S;

combining the approximation concentration matrix $Ȼ_a$ and the detail concentration matrix $Ȼ_d$ to provide a transformed concentration matrix $Ȼ$; and applying an inverse wavelet transform to the transformed concentration matrix $Ȼ$ to provide the concentration matrix C.

6. A method for analyzing multivariate images, comprising:

a) providing a data factor matrix A and a data factor matrix B obtained from a factorization of measured spectral data D, b) transforming the data factor matrix A, using a wavelet transform, to obtain a transformed data factor matrix Ã, c) thresholding the wavelet coefficients of the transformed data factor matrix Ã, d) performing an image analysis on the transformed data factor matrix Ã and data factor matrix B to obtain a spatially compressed concentration matrix $\tilde{C}$ and a spectral shapes matrix S, and e) computing a concentration matrix C from the spatially compressed concentration matrix $\tilde{C}$.

7. The method of claim 6, wherein the data factor matrix A comprises a total of j blocks of data factors $A_i$ and the data factor matrix B comprises k blocks of data factors $B_i$, thereby providing a concentration block $C_i$ in step e), and wherein steps a) through e) are repeated sequentially until the concentration matrix C is accumulated blockwise, according to $C=[C_1 C_2 \ldots C_{j-1} C_j]$.

8. The method of claim 6, wherein the wavelet transform comprises a Haar transform.

9. The method of claim 6, wherein the thresholding comprises decimating the detail coefficients.

10. The method of claim 6, wherein the image analysis of step d) comprises an alternating least squares analysis and the spatially compressed concentration matrix $\tilde{C}$ and the spectral shapes matrix S are obtained from a constrained least squares solution of $$\min_{\tilde{C},S} \|\tilde{A}B^T - \tilde{C}S^T\|_F.$$

11. The method of claim 10, wherein the alternating least squares analysis comprises a transformed non-negativity constraint.

12. The method of claim 6, wherein the computing step e) comprises applying an inverse wavelet transform to the spatially compressed concentration matrix $\tilde{C}$ to provide the concentration matrix C.

13. The method of claim 6, wherein the computing step e) comprises projecting the product of the data factor matrix A and the data factor matrix B from step a) onto the spectral shapes matrix S from step d), according to $$\min_C \|AB^T - CS^T\|_F$$

and subject to appropriate constraints.

14. The method of claim 6, wherein the data factor matrix A comprises a scores matrix T and the data factor matrix B comprises a loadings matrix P, and wherein T and P are obtained from a principal components analysis of the measured spectral data D, according to $D=TP^T$.

15. The method of claim 14, wherein T and P represent the significant components of the principal components.

16. The method of claim 1, wherein the data matrix D is weighted.

17. The method of claim 6, wherein the data factor matrix A and the data factor matrix B are weighted.

18. The method of claim 1, wherein the wavelet transform applying step b) comprises:

folding the data matrix D into a (x+1)-dimensional multiway array $\underline{D}$ consisting of x spatial dimensions and 1 spectral dimension comprising p spectral channels, wherein x=1, 2, or 3;

applying an independent wavelet transform to each of the x spatial dimensions for each of the p spectral channels to provide a transformed multiway array $\underline{Đ}$;

partitioning the transformed multiway array $\underline{Đ}$ into a multiway approximation array $\underline{Đ}_a$ and a multiway detail array $\underline{Đ}_d$; and unfolding the multiway approximation array $\underline{Đ}_a$ to obtain the approximation matrix $Đ_a$ and the detail matrix $Đ_d$.

19. The method of claim 18, wherein the computing step d) comprises:

computing a detail concentration matrix $Ȼ_d$ from the detail matrix $Đ_d$ and the spectral shapes matrix S;

combining the approximation concentration matrix $Ȼ_a$ and the detail concentration matrix $Ȼ_d$ to provide a transformed concentration matrix $Ȼ$;

folding the transformed concentration matrix $Ȼ$ into an (x+1)-dimensional transformed concentration matrix $\underline{Ȼ}$;

applying an independent inverse wavelet transform to each of the x spatial dimensions of the transformed concentration array $\underline{Ȼ}$ to obtain the multiway concentration array $\underline{C}$; and unfolding the multiway concentration array $\underline{C}$ to obtain the concentration matrix C.

20. The method of claim 1, wherein D is a 2D data matrix comprising m rows and n columns and the wavelet transforms W are applied according to $(W_n \otimes W_m) \times D = Đ$.

21. A method for analyzing multivariate images, comprising:

a) providing a data matrix D containing measured spectral data, b) applying at least one wavelet transform to the data matrix D to obtain a transformed data matrix Ð comprising an approximation matrix $Ð_a$, c) performing an image analysis on the approximation matrix $Ð_a$ to obtain a spectral shapes matrix S, and d) computing a concentration matrix C from the data matrix D, and the spectral shapes matrix S.

22. The method of claim 21, wherein the at least one wavelet transform comprises a Haar transform.

23. The method of claim 21, wherein the image analysis of step c) comprises an alternating least squares analysis and an approximation concentration matrix $Ɇ_a$ and the spectral shapes matrix S are obtained from a constrained least squares solution of $\min\|Ð_a - Ɇ_a S^T\|_F$.

24. The method of claim 23, wherein the alternating least squares analysis comprises a transformed non-negativity constraint $Ɇ_a \geq 0$.

25. The method of claim 21, wherein the computing step d) comprises projecting the data matrix D from step a) onto the spectral shapes matrix S from step c), according to $$\min_C \|D - CS^T\|_F,$$

subject to constraints.

26. The method of claim 21, wherein the wavelet transforms applying step b) comprises:

folding the data matrix D into a (x+1)-dimensional multiway array $\underline{D}$ consisting of x spatial dimensions and 1 spectral dimension comprising p spectral channels, wherein x=1, 2, or 3;

applying an independent wavelet transform to each of the x spatial dimensions for each of the p spectral channels to provide a transformed multiway array $\underline{Ð}$;

decimating the detail coefficients of the transformed multiway array $\underline{Ð}$ to obtain a multiway approximation array $\underline{Ð}_a$; and unfolding the multiway approximation array $\underline{Ð}_a$ to obtain the approximation matrix $Ð_a$.

* * * * *